US012775173B2

(12) United States Patent
Ronen et al.

(10) Patent No.: US 12,775,173 B2
(45) **Date of Patent: *Oct. 27, 2026**

(54) GENERATION OF COLOR IMAGES USING WHITE LIGHT AS SOURCE

(71) Applicant: LUMUS LTD., Nes Ziona (IL)

(72) Inventors: Eitan Ronen, Rechovot (IL); Ronen Chriki, Lod (IL); Jonathan Gelberg, Modiin (IL)

(73) Assignee: LUMUS LTD., Nes Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,024

(22) Filed: Feb. 10, 2025

(65) Prior Publication Data

US 2025/0180913 A1 Jun. 5, 2025

Related U.S. Application Data

(62) Division of application No. 18/017,865, filed as application No. PCT/IL2021/051039 on Aug. 24, 2021, now Pat. No. 12,222,508.

(60) Provisional application No. 63/070,564, filed on Aug. 26, 2020.

(51) Int. Cl.

*G02B 27/01* (2006.01)
*F21V 8/00* (2006.01)
*G09G 3/00* (2006.01)
*G09G 3/34* (2006.01)

(52) U.S. Cl.

CPC ....... *G02B 27/0172* (2013.01); *G02B 6/0015* (2013.01); *G02B 6/0076* (2013.01); *G09G 3/001* (2013.01); *G09G 3/3426* (2013.01); *G02B 2027/0114* (2013.01); *G09G 2320/0233* (2013.01); *G09G 2340/12* (2013.01)

(58) Field of Classification Search

None

See application file for complete search history.

(56) References Cited

U.S. PATENT DOCUMENTS

2014/0003762 A1* 1/2014 Macnamara ........... G02B 6/262 385/39
2018/0231771 A1* 8/2018 Schuck, III .............. G02B 5/20
2018/0335629 A1* 11/2018 Cheng ................ G02B 27/0172
2021/0116622 A1* 4/2021 Olkkonen .......... G02B 27/0172
2021/0356747 A1* 11/2021 Komandury ....... G02B 27/1013

* cited by examiner

*Primary Examiner* — Sarvesh J Nadkarni

(74) *Attorney, Agent, or Firm* — The Roy Gross Law Firm, LLC; Roy D. Gross

(57) ABSTRACT

Disclosed herein is an optical assembly for generating a color image using white light as source. The optical assembly includes a broadband white light source array, a color filter assembly configured to allow selectively filtering therethrough light in each of three additive primary colors, and a control unit. The control unit is configured to actuate light sources in the light source array according to three intensity maps. Each of the intensity maps corresponds to one of the three additive primary colors. The control unit is further configured to synchronize operations of the light source array and the color filter arrangement such that, when light sources in the light source array are actuated according to one of the three intensity maps, the color filter arrangement filters therethrough light at the additive primary color to which the intensity map corresponds.

19 Claims, 9 Drawing Sheets

GENERATION OF COLOR IMAGES USING WHITE LIGHT AS SOURCE

CROSS REFERENCE TO RELATED APPLICATIONS

This application is a divisional of U.S. Ser. No. 18/017,865 filed Jan. 25, 2023, which is a National Phase of PCT Patent Application No. PCT/IL2021/051039 having International filing date of Aug. 24, 2021, which claims the benefit of priority of U.S. Provisional Patent Application No. 63/070,564, filed Aug. 26, 2020, the contents of which are all incorporated herein by reference in their entirety.

TECHNICAL FIELD

The present disclosure relates generally to production of color images using white light as source.

BACKGROUND

Augmented reality (AR) near-eye displays (NEDs)—also referred to as (AR) head-mounted displays or (AR) wearable displays-integrate a projected virtual (digital) image into the field-of-view of the wearer. Since the virtual images are comparatively small, typically, self-emissive displays are preferred, being highly-efficient in terms of power consumption. In principle, a light emitting diode (LED) array including three groups of LEDs, configured to generate red, green, and blue light, may be employed to provide illumination. However, due to limitations on the dimensions of state-of-the-art color LEDs, producing uniform virtual color images (using color LEDs) remains a challenge.

SUMMARY

Aspects of the disclosure, according to some embodiments thereof, relate to production of color images using white light as source. More specifically, but not exclusively, aspects of the disclosure, according to some embodiments thereof, relate to color image production in augmented reality near eye displays using broadband white light as source.

Thus, according to an aspect of some embodiments, there is provided an optical assembly for generating a color image using white light as source. The optical assembly includes:

A light source array (LSA) including a plurality of broadband white light sources.

A color filter assembly (CFA) configured to allow selectively filtering therethrough light in each of three additive primary colors (APCs).

A control unit.

The control unit is configured to actuate light sources in the LSA according to three intensity maps. Each of the intensity maps corresponding to one of the APCs. The control unit is further configured to synchronize operations of the LSA and the CFA such that, when light sources in the LSA are actuated according to an intensity map corresponding to one of the APCs, the CFA filters therethrough light in the corresponding APC.

According to some embodiments of the optical assembly, the LSA is a LED array.

According to some embodiments of the optical assembly, the LED array is an inorganic micro-LED (mLED) array or an organic LED (OLED) array.

According to some embodiments of the optical assembly, the CFA includes a liquid crystal display (LCD) array. Each cell in the LCD array corresponds to one of the three APCs, respectively. Cells corresponding to the same APC are jointly on and off switchable by the control unit, such that: (i) when switched on, each of the cells filters therethrough light in the corresponding APC, and (ii) when switched off, each of the cells blocks all light impinging thereon. The optical assembly further includes a linear polarizer configured to polarize the light generated by the LSA.

According to some embodiments of the optical assembly, the CFA includes at least three color filters, individually on and off switchable by the control unit. At least one of the color filters is configured to, when switched on, filter therethrough light in a respective APC from the three APCs, and, when switched off, block all light arriving thereat, and/or at least one of the color filters is configured to, when switched on, block light in a respective APC from the three APCs, and, when switched off, block all light arriving thereat. The control unit is configured to collectively switch the at least three color filters between three transmission modes, such that in each transmission mode light in a respective APC from the three APCs is filtered through the CFA.

According to some embodiments of the optical assembly, the at least three color filters include a first color filter, a second color filter, and a third color filter configured to filter therethrough light in only one of the three APCs, respectively. The CFA further includes a first waveguide, configured to have transmitted thereinto light generated by the LSA, a second waveguide, and at least three dichroic mirrors. Each of the dichroic mirrors is configured to reflect or filter light in a respective APC from the three APCs. The first, second, and third color filters are disposed between the waveguides. Each of the dichroic mirrors is embedded within one of the waveguides, such that (i) light generated by the LSA, and incident on a dichroic mirror, embedded in the first waveguide, is either directed thereby onto a respective one of the first, second, and third color filters or onto an adjacent dichroic mirror in the first waveguide, and (ii) light filtered through any of the first, second, and third color filters, and incident on a dichroic mirror, embedded in the second waveguide, is reflected inside the second waveguide.

According to some embodiments of the optical assembly, the at least three dichroic mirrors include six dichroic mirrors. A first dichroic mirror, a second dichroic mirror, and a third dichroic mirror are embedded in a first side-portion, a central portion, and a second side-portion of the first waveguide, respectively. The central portion of the first waveguide is disposed between the first and second side-portions of the first waveguide. A fourth dichroic mirror, a fifth dichroic mirror, and a sixth dichroic mirror are embedded in a first side-portion, a central portion, and a second side-portion of the second waveguide, respectively. The central portion of the second waveguide is disposed between the first and second side-portions of the second waveguide. The first, second, and third color filters are disposed between the first side-portions, the central portions, and the second side-portions, respectively. The first, second, and third color filters and the dichroic mirrors are configured such that when only the first color filter, only the second color filter, and only the third color filter, is switched on, light, generated by the LSA, and incident on the first side-portion of the first waveguide, is filtered into the first, second, and third APCs, respectively, and is output at the second side-portion of the second waveguide.

According to some embodiments of the optical assembly, at least one of the at least three color filters includes a respective filter component and a respective shutter. The filter component is configured to transmit light only in the corresponding APC. Each shutter is configured to be controllably opened and closed at command from the control unit, such that, when closed, the shutter prevents light from arriving at the respective filter component or blocks light transmitted through the respective filter component.

According to some embodiments of the optical assembly, at least one of the shutters is an LCD panel, configured to be actuated by the control unit. The optical assembly further includes a linear polarizer configured to polarize the light generated by the LSA.

According to some embodiments, at least one of the shutters is a mechanical shutter.

According to some embodiments of the optical assembly, the CFA further includes a first waveguide, a second waveguide, and a third waveguide, which are adjacently and successively disposed. The first waveguide has embedded, in a first side-portion thereof, a first beam splitting component, and, at a second side-portion thereof, a first mirror. The second waveguide has embedded, in a first side-portion thereof, a second beam splitting component, and, at a second side-portion thereof, a third beam splitting component. The third waveguide has embedded, in a first side-portion thereof, a second mirror, and, at a second side-portion thereof, a fourth beam splitting component. The first waveguide is configured to receive thereinto, at the first side-portion thereof, light generated by the LSA. The third waveguide is configured to output, from the second side-portion thereof, light received thereinto.

According to some embodiments of the optical assembly, the beam splitting component is a dichroic mirror, a diffraction grating, or a dielectric beam splitter.

According to some embodiments of the optical assembly, the at least three color filters include four color filters. A first color filter is disposed between the first side-portion of the first waveguide and the first side-portion of the second waveguide, or embedded within the first side-portion of the first waveguide. A second color filter is disposed between the second side-portion of the first waveguide and the second side-portion of the second waveguide, or embedded within the second side-portion of the first waveguide. A third color filter is disposed between the first side-portion of the second waveguide and the first side-portion of the third waveguide, or embedded within the first side-portion of the second waveguide. A fourth color filter being disposed between the second side-portion of the second waveguide and the second side-portion of the third waveguide, or embedded within the second side-portion of the first waveguide. APC filtering properties of each of the color filters, positionings thereof, and actuation times, are such that the first waveguide propagates there across light only in the first APC, the second waveguide propagates there across light only in the second APC, and the third waveguide propagates there across light only in the third APC.

According to some embodiments of the optical assembly, (i) when switched on, the first color filter blocks only light in the first APC, (ii) when switched on, the second color filter filters therethrough only light in the first APC, (iii) when switched on, the third color filter filters therethrough only light in the second APC, and (iv) when switched on, the fourth color filter blocks only light in the second APC.

According to some embodiments of the optical assembly, the optical assembly further includes optics configured to direct light from the LSA onto the CFA.

According to some embodiments of the optical assembly, the optics includes one or more lenses configured to collimate light generated by the LSA.

According to some embodiments of the optical assembly, the CFA includes a liquid crystal on silicon (LCoS) array. Each cell in the LCoS array includes sub-cells corresponding to each of the three APCs, respectively. The LCoS array is switchable between three reflection modes corresponding to the three APCs, such that in each reflection mode, each sub-cell corresponding to the APC reflects light in the APC at a reflection level dictated by the control unit and the rest of the sub-cells are switched off. The light generated by the LSA is linearly polarized and/or wherein the optical assembly further includes a linear polarizer.

According to some embodiments of the optical assembly, each of the light sources in the LSA is configured to illuminate at least one cell from the cells in the LCoS array.

According to some embodiments of the optical assembly, the optical assembly is configured such that substantially every cell in the LCoS array is positioned to receive light substantially only from the respective light source in the LSA.

According to some embodiments of the optical assembly, the CFA further includes a first polarizing beam splitter (PBS) and first collimating optics. The first PBS is configured to reflect polarized light, generated by the LSA or filtered through the polarization filter, towards the LCoS array. The first collimating optics is configured to collimate the reflected polarized light arriving thereat via the first PBS. The CFA is configured such that the collimated light is next indirectly output, having passed again through the first PBS, or directly output (i.e. without repassage via the first PBS), such as to be imaged on the LCoS array.

According to some embodiments of the optical assembly, the first collimating optics includes a collimating mirror arrangement (which may include one or more curved mirrors and lenses and/or Fresnel lenses). The CFA is configured such that the collimated light is indirectly output having passed again through the first PBS. The CFA further includes a quarter waveplate positioned between the first PBS and the collimating mirror arrangement, such that the on reentry to the first PBS, the polarization of the light has been rotated by 90°.

According to some embodiments of the optical assembly, the optical assembly further includes a second PBS and second collimating optics, wherein light generated by the LSA is first passed through the second PBS, collimated by the second collimating optics, and directly or indirectly propagated therefrom into the first PBS, such as to be imaged on the LCoS array.

According to some embodiments of the optical assembly, the control unit is configured to send to the LCoS array three additional intensity maps corresponding to the three APCs, respectively. The three additional intensity maps are of higher resolution than the intensity maps according to which the LSA is actuated. Each intensity map, according to which the LSA is actuated, and a respective one of the three additional intensity maps, sent to the LCoS array, which corresponds to the same APC, in combination reproduce an intensity map associated with the corresponding APC, as specified by a color bitmap stored in the control unit.

According to some embodiments of the optical assembly, the CFA includes a first filter, a second filter, and a third filter, which are individually openable and closeable by the controller. Each filter is configured to transmit all light incident thereon when open, and block all light incident thereon when closed. The CFA further includes a first waveguide, configured to have transmitted thereinto light generated by the LSA, a second waveguide, and at least three dichroic mirrors. Each of the dichroic mirrors is configured to reflect or filter light in a respective APC from the three APCs. The three filters (i.e. the first, second, and third filters) are disposed between the waveguides. Each of the dichroic mirrors is embedded within one of the waveguides, such that: (i) light generated by the LSA, and incident on a dichroic mirror, embedded in the first waveguide, is either directed thereby onto a respective one of the three filters or onto an adjacent dichroic mirror in the first waveguide, and (ii) light filtered through any of the three filters and incident on a dichroic mirror, embedded in the second waveguide, is reflected inside the second waveguide.

According to some embodiments of the optical assembly, the at least three dichroic mirrors include six dichroic mirrors. A first dichroic mirror, a second dichroic mirror, and a third dichroic mirror, are embedded in a first side-portion, a central portion, and a second side-portion of the first waveguide, respectively, with the central being disposed between the first and second side-portions. A fourth dichroic mirror, a fifth dichroic mirror, and a sixth dichroic mirror, are embedded in a first side-portion, a central portion, and a second side-portion of the second waveguide, respectively, with the central portion being disposed between the first and second side-portions. The first, second, and third filters are disposed between the first side-portions, the central portions, and the second side-portions, respectively. The filters and dichroic mirrors are configured such that when only the first filter, only the second filter, and only the third filter is open, light, generated by the LSA, and incident on the first side-portion of the first waveguide, is filtered into the first, second, and third APCs, respectively, and is output at the second side-portion of the second waveguide.

According to some embodiments of the optical assembly, the CFA includes a first filter, a second filter, a third filter, and a fourth filter, which are individually openable and closeable by the control unit. Each filter is configured to transmit all light incident thereon when open, and block all light incident thereon when closed. The CFA further includes a first waveguide, a second waveguide, and a third waveguide, which are adjacently and successively disposed. The first waveguide has embedded, in a first side-portion thereof, a first beam splitting component, and, in a second side-portion thereof, a first mirror. The second waveguide has embedded, in a first side-portion thereof, a second beam splitting component, and, in a second side-portion thereof, a third beam splitting component. The third waveguide has embedded, in a first side-portion thereof, a second mirror, and, in a second side-portion thereof, a fourth beam splitting component. The first waveguide is configured to receive thereinto, at the first side-portion thereof, light generated by the LSA. The third waveguide is configured to output, from the second side-portion thereof, light received thereinto, Each of the beam splitting components is a dichroic mirror or a diffraction grating.

According to some embodiments of the optical assembly, the first filter is disposed between the first side-portion of the first waveguide and the first side-portion of the second waveguide, or is embedded within the first side-portion of the first waveguide. The second filter is disposed between the second side-portion of the first waveguide and the second side-portion of the second waveguide, or is embedded within the second side-portion of the first waveguide. The third filter is disposed between the first side-portion of the second waveguide and the first side-portion of the third waveguide, or is embedded within the first side-portion of the second waveguide. The fourth filter is disposed between the second side-portion of the second waveguide and the second side-portion of the third waveguide, or is embedded within the second side-portion of the first waveguide. The first dichroic mirror is configured to reflect only light in the first APC. The second dichroic mirror is configured to transmit only light in the third APC or reflect only light in the second APC. The third dichroic mirror is configured to transmit only light in the first APC or reflect only light in the second APC. The fourth dichroic mirror is configured reflect only light in the third APC. The positionings of the four filters, and actuation times thereof, are such that the first waveguide propagates there across only light in the first APC, the second waveguide propagates there across only light in the second APC, and the third waveguide propagates there across only light in the third APC.

According to some embodiments of the optical assembly, the three APCs include red, green, and blue (RGB).

According to some embodiments of the optical assembly, wherein the optical assembly includes the LCD array, the cells on the LCD array are arranged in a non-periodic pattern configured to suppress diffraction patterns (e.g. diffraction lobes) in light output by the CFA.

According to some embodiments of the optical assembly, the at least three intensity maps jointly constitute a color bitmap.

According to some embodiments of the optical assembly, the control unit is further configured to successively actuate light sources in the LSA according to a plurality of groups of intensity maps. Each group of intensity maps includes at least three intensity maps corresponding to the three APCs, such that the light output by the optical assembly corresponds to a sequence of video frames.

According to some embodiments of the optical assembly, the CFA is further configured to allow for controllable transmission therethrough of white light. The control unit is further configured to actuate light sources in the LSA according to an additional intensity maps, corresponding to white light.

According to some embodiments of the optical assembly, the optical assembly is coupled to a lightguide optical element (LOE). The LOE is configured to receive thereinto, light output by the optical assembly, propagate therethrough the light, and output the light together with ambient light incident on the LOE, such that a (virtual) image formed by the light from the optical assembly is overlaid on a (real) image formed by the ambient light.

According to an aspect of some embodiments, there is provided an augmented-reality (AR) near-eye display (NED) system including any one of the optical assemblies described above and the LOE described above.

According to an aspect of some embodiments, there is provided a method for overlaying a virtual (digital) image on a real image in an AR NED. The method includes, for each of three intensity maps corresponding to three APCs, respectively, stages of:

Providing an AR NED as described above.

Actuating broadband white light sources in an LSA of an optical assembly of the AR NED, according to the intensity map.

Selectively filtering light produced by the LSA into the corresponding APC by passing the light through a CFA of the optical assembly;

Directing light, filtered through the CFA, into a LOE of the AR NED.

According to an aspect of some embodiments, there is provided a method for overlaying a virtual image on a real image in an AR NED. The method includes, for each of three intensity maps corresponding to APCs, respectively, stages of:

Actuating broadband white light sources in a LSA of an optical assembly of an AR NED, according to the intensity map.

Selectively filtering light produced by the LSA into the corresponding APC by passing the light through a CFA of the optical assembly.

Directing light, filtered through the CFA, into a LOE of the AR NED.

The LOE is configured to output the filtered light together with ambient light incident on the LOE, such that an image formed by the filtered light is overlaid on an image formed by the ambient light.

According to some embodiments of the method, the LSA is a LED array.

According to some embodiments of the method, the LED array is an inorganic mLED array or an OLED array.

According to some embodiments of the method, the CFA includes an LCD array. Each cell in the LCD array corresponds to one of the three APCs, respectively. Cells corresponding to the same APC are jointly on and off switchable, such that (i) when switched on, each of the cells filters therethrough light in the corresponding APC, and (ii) when switched off, each of the cells blocks all light impinging thereon. The light generated by the LSA is polarized by a linear polarizer prior to being passed through the CFA.

According to some embodiments of the method, the CFA includes at least three color filters, individually on and off switchable. At least one of the color filters is configured to, when switched on, filter therethrough light in a respective APC from the three APCs, and, when switched off, block all light arriving thereat, and/or at least one of the color filters is configured to, when switched on, block light in a respective APC from the three APCs, and, when switched off, block all light arriving thereat. The at least three color filters are collectively switchable between three transmission modes, such that in each transmission mode light in a respective APC from the three APCs is filtered through the CFA.

According to some embodiments of the method, the at least three color filters include a first color filter, a second color filter, and a third color filter configured to filter therethrough light in the three APCs, respectively. The CFA further includes a first waveguide, configured to have transmitted thereinto light generated by the LSA, a second waveguide, and at least three dichroic mirrors. Each of the dichroic mirrors is configured to reflect or filter light in a respective APC from the three APCs. The three color filters are disposed between the waveguides. Each of the dichroic mirrors is embedded within one of the waveguides, such that (i) light generated by the LSA, and incident on a dichroic mirror, embedded in the first waveguide, is either directed thereby onto a respective one of the three color filters or onto an adjacent dichroic mirror in the first waveguide, and (ii) light filtered through the three color filters, and incident on a dichroic mirror, embedded in the second waveguide, is reflected inside the second waveguide.

According to some embodiments of the method, the at least three dichroic mirrors include six dichroic mirrors. A first dichroic mirror, a second dichroic mirror, and a third dichroic mirror, are embedded in a first side-portion, central portion, and second side-portion of the first waveguide, respectively. The central portion of the first waveguide is disposed between the first and second side-portions of the first waveguide. A fourth dichroic mirror, a fifth dichroic mirror, and a sixth dichroic mirror, are embedded in a first side-portion, central portion, and second side-portion of the second waveguide, respectively. The central portion of the second waveguide is disposed between the first and second side-portions of the second waveguide. The first, second, and third color filters are disposed between the first side-portions, the central portions, and the second side-portions, respectively. The first, second, and third color filters and dichroic mirrors are configured such that when only the first color filter, only the second color filter, and only the third color filter, is switched on, light, generated by the LSA, and incident on the first side-portion of the first waveguide, is filtered into the first, second, and third APCs, respectively, and is output at the second side-portion of the second waveguide.

According to some embodiments of the method, at least one of the at least three color filters includes a respective filter component and a respective shutter. The filter component is configured to transmit light only in the corresponding APC. Each shutter is configured to be controllably opened and closed at command, such that, when closed, the shutter prevents light from arriving at the respective filter component or blocks light transmitted through the respective filter component.

According to some embodiments of the method, the CFA further includes a first waveguide, a second waveguide, and a third waveguide, which are adjacently and successively disposed. The at least three color filters include four color filters including a first pair of color filters, disposed between the first waveguide and the second waveguide, and a second pair of color filters, disposed between the second waveguide and the third waveguide. The first waveguide has embedded, in a first side-portion thereof, a first beam splitting component, and, in a second side-portion thereof, a first mirror. The second waveguide has embedded, in a first side-portion thereof, a second beam splitting component, and, in a second side-portion thereof, a third beam splitting component. The third waveguide has embedded, in a first side-portion thereof, a second mirror, and, in a second side-portion thereof, a fourth beam splitting component. The first waveguide is configured to receive thereinto, at the first side-portion thereof, light generated by the LSA, and the third waveguide is configured to output, from the second side-portion thereof, light received thereinto.

According to some embodiments of the method, each of the beam splitting components is a dichroic mirror, a diffraction grating, or a dielectric beam splitter.

According to some embodiments of the method, a first of the four color filters is disposed between the first side-portion of the first waveguide and the first side-portion of the second waveguide, or embedded within the first side-portion of the first waveguide. A second of the four color filters is disposed between the second side-portion of the first waveguide and the second side-portion of the second waveguide, or embedded within the second side-portion of the first waveguide. A third of the four color filters is disposed between the first side-portion of the second waveguide and the first side-portion of the third waveguide, or embedded within the first side-portion of the second waveguide. A fourth of the four color filters is disposed between the second side-portion of the second waveguide and the second side-portion of the third waveguide, or embedded within the second side-portion of the first waveguide. APC filtering properties of each of the four color filters, positionings thereof, and actuation times, are such that the first waveguide propagates there across only light in the first APC, the second waveguide propagates there across only light in the second APC, and the third waveguide propagates there across only light in the third APC.

According to some embodiments of the method, (i) when switched on, the first color filter (i.e. the first of the four color filters) blocks only light in the first APC, (ii) when switched on, the second color filter (i.e. the second of the four color filters) filters therethrough only light in the first APC, (iii) when switched on, the third color filter (i.e. the third of the four color filters) filters therethrough only light in the second APC, and (iv) when switched on, the fourth color filter (i.e. the fourth of the four color filters) blocks only light in the second APC.

According to some embodiments of the method, the CFA includes a LCoS array. Each cell in the LCoS array includes sub-cells corresponding to each of the three APCs, respectively. The LCoS array is switchable between three reflection modes corresponding to the three APCs, such that in each reflection mode, each sub-cell corresponding to the APC reflects only light in the APC at a reflection level dictated by a respective one of three additional intensity maps, and the rest of the sub-cells are switched off. The light generated by the LSA is polarized by a linear polarizer prior to being passed through the CFA.

According to some embodiments of the method, each of the light sources in the LSA is configured to illuminate at least one cell from the cells in the LCoS array.

According to some embodiments of the method, the optical assembly is configured such that substantially every cell in the LCoS array is positioned to receive light substantially only from the respective light source in the LSA.

According to some embodiments of the method, the CFA further includes a first PBS and first collimating optics. The first PBS is configured to reflect polarized light, generated by the LSA or filtered through the polarization filter, towards the LCoS array. The first collimating optics is configured to collimate the reflected polarized light arriving thereat via the first PBS. The CFA is configured such that the collimated light is next indirectly output, having passed again through the first PBS, or directly output.

According to some embodiments of the method, the first collimating optics includes a collimating mirror arrangement. The CFA is configured such that the collimated light is indirectly output having passed again through the first PBS. The CFA further includes a quarter waveplate positioned between the first PBS and the collimating mirror arrangement, such that the on reentry to the first PBS, the polarization of the light has been rotated by 90°.

According to some embodiments of the method, wherein the light generated by the LSA is first passed through a second PBS and a second collimating optics, so as to be imaged on the LCoS array.

According to some embodiments of the method, the CFA includes a first filter, a second filter, and a third filter, which are individually openable and closeable by the controller. Each filter is configured to transmit all light incident thereon when open, and block all light incident thereon when closed. The CFA further includes a first waveguide, configured to have transmitted thereinto light generated by the LSA, a second waveguide, and at least three dichroic mirrors. Each of the dichroic mirrors is configured to reflect or filter light in a respective APC from the three APCs. The three filters (i.e. the first, second, and third filters) are disposed between the waveguides. Each of the dichroic mirrors is embedded within one of the waveguides, such that: (i) light generated by the LSA, and incident on a dichroic mirror, embedded in the first waveguide, is either directed thereby onto a respective one of the three filters or onto an adjacent dichroic mirror in the first waveguide, and (ii) light filtered through any of the three filters and incident on a dichroic mirror, embedded in the second waveguide, is reflected inside the second waveguide.

According to some embodiments of the method, the at least three dichroic mirrors include six dichroic mirrors. A first dichroic mirror, a second dichroic mirror, and a third dichroic mirror, are embedded in a first side-portion, a central portion, and a second side-portion of the first waveguide, respectively, with the central being disposed between the first and second side-portions. A fourth dichroic mirror, a fifth dichroic mirror, and a sixth dichroic mirror, are embedded in a first side-portion, a central portion, and a second side-portion of the second waveguide, respectively, with the central portion being disposed between the first and second side-portions. The first, second, and third filters are disposed between the first side-portions, the central portions, and the second side-portions, respectively. The filters and dichroic mirrors are configured such that when only the first filter, only the second filter, and only the third filter is open, light, generated by the LSA, and incident on the first side-portion of the first waveguide, is filtered into the first, second, and third APCs, respectively, and is output at the second side-portion of the second waveguide.

According to some embodiments of the method, the CFA includes a first filter, a second filter, a third filter, and a fourth filter, which are individually openable and closeable by the control unit. Each filter is configured to transmit all light incident thereon when open, and block all light incident thereon when closed. The CFA further includes a first waveguide, a second waveguide, and a third waveguide, which are adjacently and successively disposed. The first waveguide has embedded, in a first side-portion thereof, a first beam splitting component, and, in a second side-portion thereof, a first mirror. The second waveguide has embedded, in a first side-portion thereof, a second beam splitting component, and, in a second side-portion thereof, a third beam splitting component. The third waveguide has embedded, in a first side-portion thereof, a second mirror, and, in a second side-portion thereof, a fourth beam splitting component. The first waveguide is configured to receive thereinto, at the first side-portion thereof, light generated by the LSA. The third waveguide is configured to output, from the second side-portion thereof, light received thereinto, Each of the beam splitting components is a dichroic mirror or a diffraction grating.

According to some embodiments of the method, the first filter is disposed between the first side-portion of the first waveguide and the first side-portion of the second waveguide, or is embedded within the first side-portion of the first waveguide. The second filter is disposed between the second side-portion of the first waveguide and the second side-portion of the second waveguide, or is embedded within the second side-portion of the first waveguide. The third filter is disposed between the first side-portion of the second waveguide and the first side-portion of the third waveguide, or is embedded within the first side-portion of the second waveguide. The fourth filter is disposed between the second side-portion of the second waveguide and the second side-portion of the third waveguide, or is embedded within the second side-portion of the first waveguide. The first dichroic mirror is configured to reflect only light in the first APC. The second dichroic mirror is configured to transmit only light in the third APC or reflect only light in the second APC. The third dichroic mirror is configured to transmit only light in the first APC or reflect only light in the second APC. The fourth dichroic mirror is configured reflect only light in the third APC. The positionings of the four filters, and actuation times thereof, are such that the first waveguide propagates there across only light in the first APC, the second waveguide propagates there across only light in the second APC, and the third waveguide propagates there across only light in the third APC.

According to some embodiments of the method, the three APCs include red, green, and blue (RGB).

According to some embodiments of the method, wherein the optical assembly includes the LCD array, the cells on the LCD array are arranged in a non-periodic pattern configured to suppress diffraction patterns in light output by the CFA.

According to some embodiments of the method, the at least three intensity maps jointly constitute a color bitmap.

According to some embodiments of the method, the light sources in the LSA are actuated according to a plurality of groups of intensity maps. Each group of intensity maps includes at least three intensity maps corresponding to the three APCs, such that images generated correspond to a sequence of video frames.

According to some embodiments of the method, the CFA is further configured to allow for controllable transmission therethrough of white light. The method further includes, following, in between, and/or after implementation of the stages thereof according to the three intensity maps:

Actuating the broadband white light sources in the LSA, according to an additional intensity map corresponding to white light.

Transmitting the white light through the CFA.

Directing the white light, transmitted through the CFA, into the LOE.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, flash memories, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures.

DETAILED DESCRIPTION

Figure 1B:
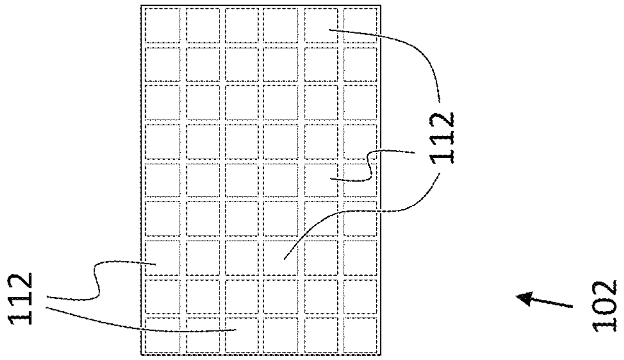
FIG. 1B schematically depicts a light source array of the optical assembly of FIG. 1A, the light source array being configured to generate broadband white light according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

Referring to the figures, in block diagrams and flowcharts, optional elements/components and stages may appear within boxes delineated by a dashed line.

As used herein, according to some embodiments, the term "color", with reference to light, is defined by an international standard, such as the CIE (International Commission on Illumination) RGB 1931 color space.

Systems

According to an aspect of some embodiments, there is provided an optical assembly for generating a color (e.g. a RGB image) using white light as a source. FIG. 1A schematically depicts such an optical assembly—an optical assembly 100—according to some embodiments. Optical assembly 100 includes a light source array (LSA) 102, a color filter arrangement (CFA) 104, and a control unit 108. Each of LSA 102 and CFA 104 is functionally associated with control unit 108 and configured to be commanded thereby, as indicated in FIG. 1A by dotted lines $L_1$ and $L_2$, and as elaborated on below. Optionally, according to some embodiments, optical assembly 100 may further include optics 110 configured to couple light generated by LSA 102 to CFA 104 and/or couple light output by CFA 104, onto an output element, as elaborated on below. According to some embodiments, and as shown in FIG. 1A, the output element may be an (optical) waveguide, such as a lightguide optical element (LOE) 10 of an augmented reality (AR) near eye display (NED).

Figure 1A:
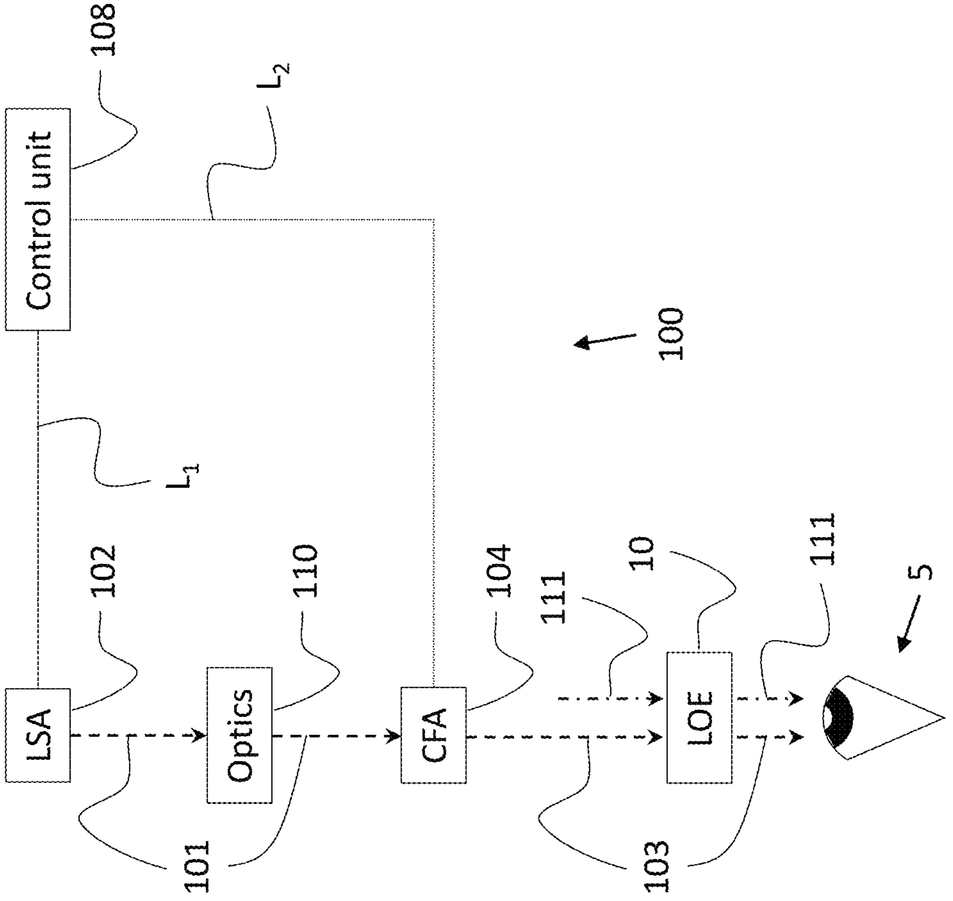
FIG. 1A presents a block diagram of an optical assembly for generating a color image using white light as source, according to some embodiments.

Referring also to FIG. 1B, FIG. 1B presents a schematic top view of LSA 102, according to some embodiments. LSA 102 may include a plurality of broadband white light sources 112. According to some embodiments, light sources 112 in LSA 102 may be individually addressable by control unit 108. According to some such embodiments, control unit 108 may be configured to control switching on and off of each of light sources 112 and intensities of each of light sources 112. More specifically, LSA 102 may be configured to generate illumination patterns based on intensity values-per each of light sources 112, respectively-received from control unit 108.

According to some embodiments, LSA 102 is a light-emitting diode (LED) array. That is, each of light sources 112 is a LED (configured to emit broadband white light). According to some such embodiments, LSA 102 is an inorganic micro-LED array (mLED) array or an organic LED (OLED) array. That is, each of the LEDs is an inorganic mLED or an OLED.

CFA 104 may be switchable by control unit 108 between three transmission modes respectively corresponding to the three additive primary colors (APCs)—i.e. red, green, and blue. In each of the transmission modes, CFA 104 may be configured to filter therethrough light at a range of wavelengths corresponding to a respective APC. More specifically, CFA 104 may be switchable at least between:

- a first transmission mode, wherein CFA 104 blocks all visible light, except light in a first APC;
- a second transmission mode, wherein CFA 104 blocks all visible light, except light in a second APC; and
- a third transmission mode, wherein CFA 104 blocks all visible light, except light in a third APC.

According to some embodiments, CFA 104 may be further switchable to a fourth transmission mode, corresponding to white light. Accordingly, in the fourth transmission mode, CFA 104 may be configured to transmit all visible light.

According to some embodiments, given image data in the form of three intensity maps corresponding to each of the three APCs, respectively—that is, given a color bitmap (specifying RGB intensities)—control unit 108 may be configured to successively send to LSA 102 each of the intensity maps. Each of the intensity maps includes the intensity values, associated with a respective APC, which are assigned to the pixels by the color bitmap. The intensity maps thus correspond to a two-dimensional (spatial) intensity distribution in each of the APCs, respectively. Each of the intensity maps dictates to each of light sources 112, a respective intensity value. As described in detail below, by sufficiently rapidly actuating light sources 112, according to each of the intensity maps, the generated illumination patterns—after filtering by CFA 104 (and, optionally, passage through an output element, such as LOE 10)—are effectively combined, so as to be perceivable by eye as a single color image (which the color bitmap encodes).

According to some embodiments, LOE 10 may be a slab waveguide. As a non-limiting example, when the AR NED is a pair of AR glasses, the LOE may constitute, or form part of, a lens of the glasses.

According to some embodiments, LOE 10 may include two or more sets of parallel partially-reflective mirrors. Different sets of partially reflective mirrors may or may not be parallel to one another. According to some embodiments, LOE 10 be a diffractive waveguide. That is, a waveguide with embedded or partially embedded diffraction gratings configured to for inputting light into the waveguide and outputting light therefrom.

Control unit 108 includes control circuitry configured to synchronize (i.e. coordinate) operations of LSA 102 and CFA 104, such that when LSA 102 produces an illumination pattern according to one of the three APCs, CFA 104 is simultaneously in a transmission mode configured to filter therethrough only light at the same APC (i.e. the APC according to which the illumination pattern is being produced). Thus, (i) when LSA 102 produces an illumination pattern according to a first intensity map, corresponding to a first APC, CFA 104 is in the first transmission mode, (ii) when LSA 102 produces an illumination pattern according to a second intensity map, corresponding to a second APC, CFA 104 is in the second transmission mode, and (iii) when LSA 102 produces an illumination pattern according to a third intensity map, corresponding to a third APC, CFA 104 is in the third transmission mode.

In operation, light generated by LSA 102, indicated by dashed arrows 101, is filtered by CFA 104, wherefrom the filtered light, indicated by arrows 103, propagates towards LOE 10 (in embodiments wherein the output element is a LOE) and enters thereinto. LOE 10 may be transparent, so that the environment is visible to a subject wearing an AR NED including optical assembly 100 and LOE 10. More precisely, LOE 10 is configured to output the filtered light and ambient light (i.e. external light from the environment; indicated by dashed arrows 111) onto an eye(s) 5 of the subject (wearing an AR NED), such that the filtered light forms a virtual image, which is overlaid on a real image formed by the ambient light.

According to some embodiments, wherein optical assembly 100 includes optics 110, optics 110 may be configured to guide the light, generated by LSA 102, onto CFA 104. According to some embodiments, optics 110 may be configured to collimate the light, generated by LSA 102. According to some such embodiments, optics 110 may include one or more collimating lenses, which may be positioned between LSA 102 and CFA 104, as described below.

According to some embodiments, control unit 108 includes one or more processing components and volatile and/or non-volatile memory components. Control unit 108 may be configured to receive a stream of color bitmaps, which may be stored in the volatile memory (i.e. random access memory (RAM)). The three intensity maps, making up each color bitmap, may be successively sent to LSA 502. According to some embodiments, control unit 108 may be configured to receive the color bitmaps by wireless communication, in which case control unit 108 may include a Wi-Fi antenna and/or a Bluetooth antenna. According to some embodiments, control unit 108 may be communicatively associated with, and configured to be controlled by, a processor of an AR NED which includes optical assembly 100.

According to some embodiments, the first APC may be red, green, or blue, the second APC may be red, green, or blue, contingent on being different from the first APC, and the third APC may be red, green, or blue, contingent on being different from both the first APC and the second APC. As non-limiting examples, the first APC may be red, the second APC may be green, and the third APC may be blue, or the first APC may be green, the second APC may be blue, and the third APC may be red.

Figure 1C:
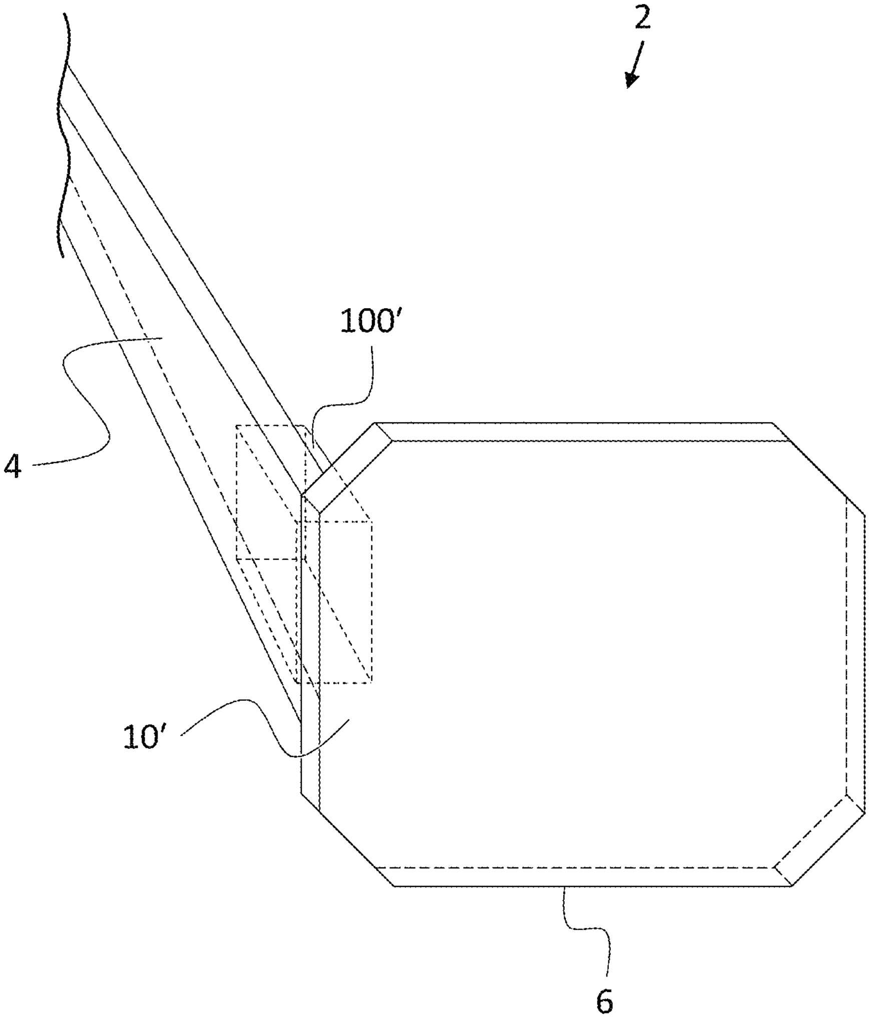
FIG. 1C schematically depicts a lens and a handle of augmented reality glasses including an optical assembly corresponding to some embodiments of the optical assembly of FIG. 1A.

FIG. 1C schematically depicts an AR NED 2 in the form of glasses, according to some embodiments. AR NED 2 includes an optical assembly 100' and a LOE 10', which correspond to specific embodiments of optical assembly 100 and LOE 10, respectively. Further shown are a handle 4 and a lens 6 of AR NED 2. Lens 6 may be mounted on handle 4. According to some embodiments, LOE 10' is constituted by lens 6. Alternatively, according to some embodiments, LOE 10' is included in lens 6. Optical assembly 100' is positioned behind LOE 10' adjacently to a first side-portion thereof (not numbered). According to some embodiments, optical assembly 100' may be embedded in, or, as shown in FIG. 1C, partially embedded in, handle 4.

Figure 2A:
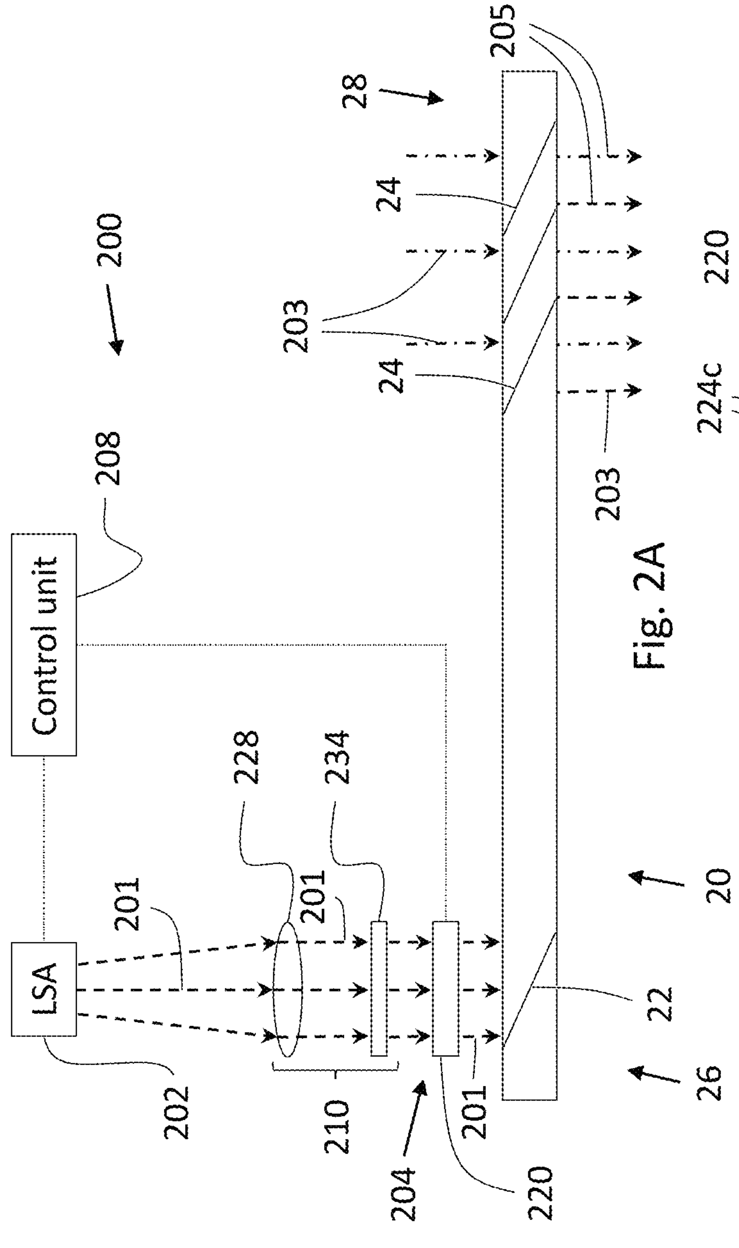
FIG. 2A schematically depicts an optical assembly for generating a color image using white light as source, the optical assembly including an LCD array and corresponding to specific embodiments of the optical assembly of FIG. 1A.

FIG. 2A schematically depicts an optical assembly 200, according to some embodiments. Optical assembly 200 corresponds to specific embodiments of optical assembly 100, wherein the CFA includes a color selective switch based on a liquid crystal display (LCD) array. Optical assembly 200 includes an LSA 202, a CFA 204 including an LCD array 220, and a control unit 208. Each of LSA 202, CFA 204, and control unit 208 corresponds to specific embodiments of LSA 102, CFA 104, and control unit 108, respectively. According to some embodiments, and as depicted in FIG. 2A, optical assembly 200 further includes optics 210, which corresponds to specific embodiments of optics 110.

Figure 2B:
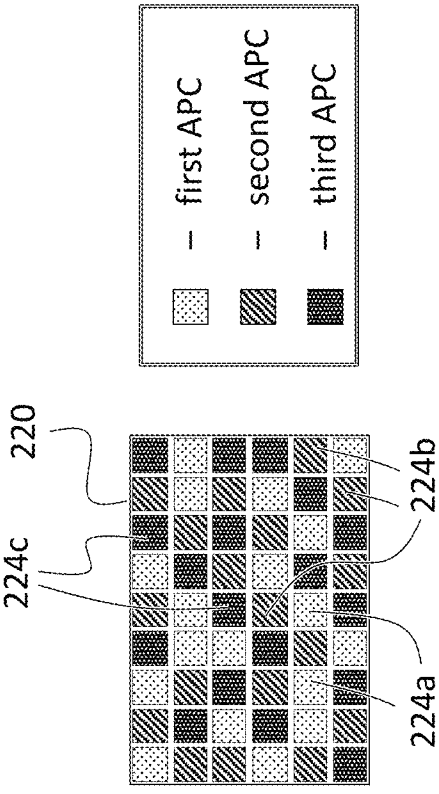
FIG. 2B schematically depicts the LCD array of FIG. 2A, according to some embodiments.

Referring also to FIG. 2B, FIG. 2B depicts LCD array 220, according to some embodiments. LCD array 220 includes a plurality of cells 224, each of which corresponds to one of the three APCs. Cells 224 include first cells 224*a*, second cells 224*b*, and third cells 224*c* corresponding to the first APC, second APC, and third APC, respectively. Cells corresponding to the same color are jointly on and off switchable by control unit 208. When switched off, a cell blocks all light impinging thereon. When switched on, a cell filters therethrough only light at the APC corresponding thereto.

More specifically, according to some embodiments, LCD array 220 is switchable by control unit 208 between three transmission modes:

In a first transmission mode, first cells 224*a* are (jointly) switched on and second cells 224*b* and third cells 224*c* are (jointly) switched off, so that LCD array 220 blocks all light except light in the first APC.

In a second transmission mode, second cells 224*b* are (jointly) switched on and third cells 224*c* and first cells 224*a* are (jointly) switched off, so that LCD array 220 blocks all light except light in the second APC.

In a third transmission mode, third cells 224*c* are (jointly) switched on and second cells 224*b* and third cells 224*c* are (jointly) switched off, so that LCD array 220 blocks all light except light in the third APC.

It is noted that in state-of-the-art LCD arrays, each cell is individually addressable in the sense that the transmission level of the cell (i.e. the percentage of light impinging on the cell, which is filtered therethrough) is controllable. This is achieved by means of a thin film transistor (TFT), which is mounted behind the cell and configured to apply a voltage of a controllable magnitude across the cell. However, the smaller the cell, the greater the dimensions of the TFT as compared to the cell, and, consequently, the greater the percentage of impinging light that is blocked, even when the transmission level is set to maximum. Hence, there is trade-off between the dimensions of the cells and the maximum transmission and the resulting quality of the images: the smaller the cells, the lesser the maximum brightness and the contrast. In particular, cells that are too large may cause local variations in the intensity of the light input into the LOE, which in turn may lead to local variations in the intensity of the (virtual) image projected onto the retina of a user (i.e. wearing the AR NED). However, if the pixels are sufficiently small as compared to the size of the (human eye) pupil, such variations would not be observed by the user.

Optical assembly 200 overcomes this limitation by forgoing the option of individually addressing of cells, so that comparatively simpler and less space consuming electronics may be used. More specifically, since all cells of the same type (i.e. corresponding to the same APC) operate together in a binary mode (i.e. are all fully transmitting or fully blocking), the anodes of all cells of the same type could be jointly short-circuited, and, similarly, the cathodes of the cells could be jointly short-circuited, so that the same voltage is applied across each of the cells. Hence, only three electrical switches are required: one per each type of cells. At the level of the individual cell, the connections to the respective anode and cathode may occupy a few square micrometers (e.g. about 10 $\mu m^2$ or even about 5 $\mu m^2$), with the result that significantly less (e.g. less than 10%) of the light impinging on a cell is blocked even when the cells are small (e.g. measuring 20 $\mu m \times 20$ $\mu m$ in area). Since the effective pupil of the system (i.e. the human pupil) has a diameter of about 4 mm (so that about 30,000 cells may be imaged there onto), as explained above, local variations of intensity will not be perceivable. The produced images are advantageously thus both bright and uniform.

Cells 224 may be arranged in any pattern known in the art of LCDs. According to some embodiments, and as depicted in FIG. 2B, cells 224 may be arranged in a non-periodic pattern, so as to eliminate occurrence of diffraction lobes or at the very least suppress diffraction lobes.

According to some embodiments, and as depicted in FIG. 2A, optics 210 may include a collimating lens 228. Collimating lens 228 may be configured to collimate light generated by LSA 202 onto LCD array 220.

According to some embodiments, LSA 202 may be a LED array, such as an inorganic mLED array or an OLED array configured generate broadband white light.

According to some embodiments, and as depicted in FIG. 2A, optics 210 may include a polarizer 234. Polarizer 234 may be positioned between LSA 202 and CFA 204 (e.g. between collimating lens 228 and LCD array 220), so as to ensure that light-originating in LSA 202 and impinging on LCD array 220—is polarized. According to some embodiments, polarizer 234 is a linear polarizer.

According to some alternative embodiments, instead of LCD array 220, a Lyot filter or a rotatable wheel with color filters may be employed. More generally, in embodiments wherein each pixel in the virtual image arises from a plane wave having a respective angular orientation (or, equivalently, in embodiments wherein the light produced by the LSA is collimated such as to appear as arriving from the eye from infinity), a global chromatic shutter may be employed, such the global chromatic shutters mentioned above and similar thereto.

Also shown in FIG. 2A are trajectories of light rays (indicated by dashed arrows 201, not all of which are numbered) from LSA 202, via collimating lens 228 and polarizer 234, to LCD array 220, and from LCD array 220 to LOE 20. According to some embodiments, light filtered through LCD array 220 may enter LOE 20 on a first end-portion 26 of LOE 20, and be reflected—for example, by a mirror(s) 22 embedded in first end-portion 26—such as to be propagated to a second end-portion 28 of LOE 20, which is opposite to first end-portion 26. Second end-portion 28 may include one or beam splitting components 24 (not all of which are numbered) configured to output the light propagated from first end-portion 28 together with ambient light (indicated by dashed arrows 203; not all of which are numbered). Outputted light rays are indicated by dashed arrows 205 (not all of which are numbered).

Figure 3A:
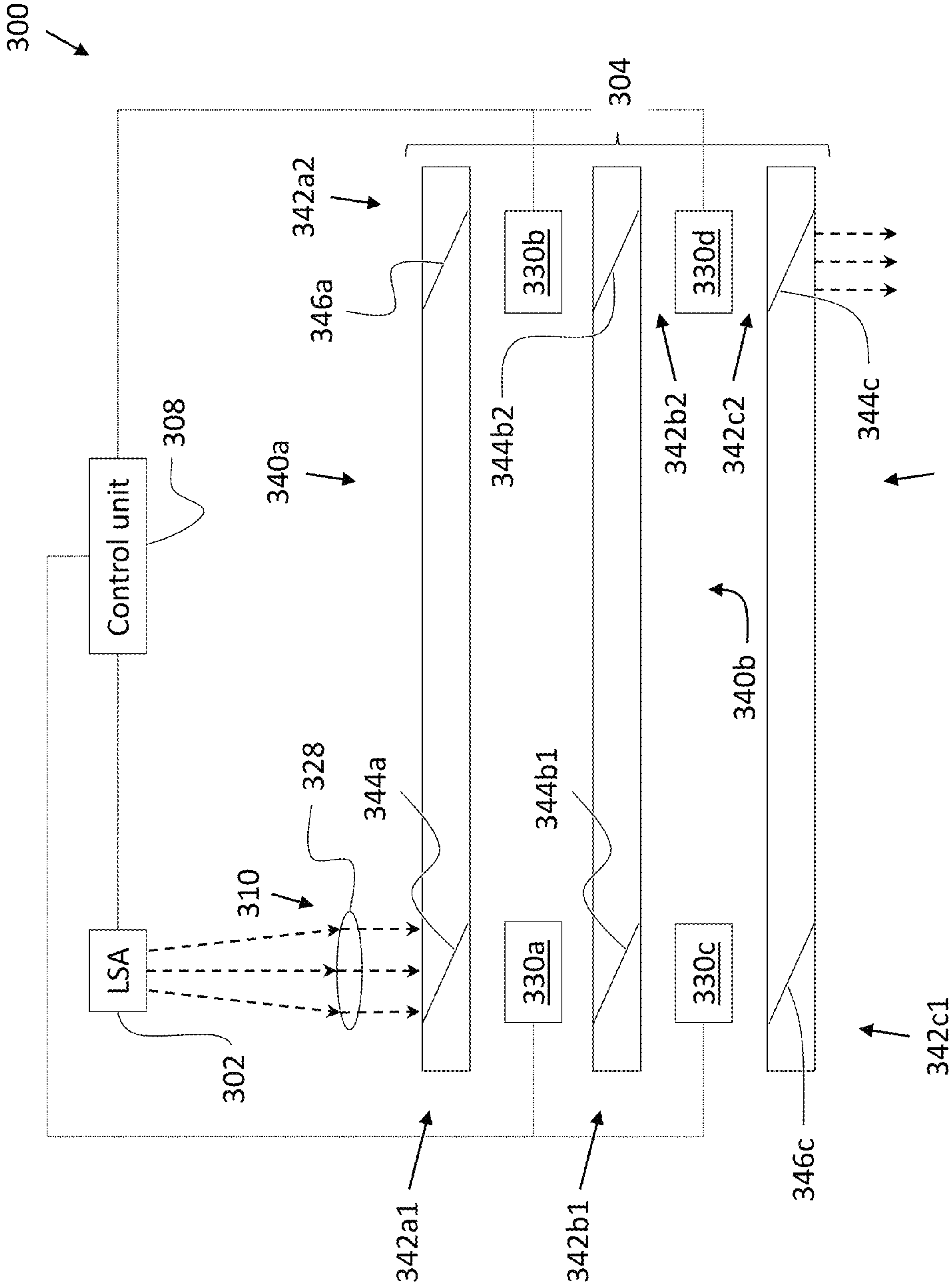
FIG. 3A schematically depicts an optical assembly for generating a color image using white light as source, which corresponds to specific embodiments of the optical assembly of FIG. 1A, the optical assembly includes a color filter arrangement including a plurality of color filters, according to some embodiments.

FIG. 3A schematically depicts an optical assembly 300, according to some embodiments. Optical assembly 300 corresponds to specific embodiments of optical assembly 100, wherein the CFA includes a plurality of color filters and waveguides. Optical assembly 300 includes an LSA 302, a CFA 304 including a plurality of color filters 330 and a plurality of waveguides 340, and a control unit 308. Each of LSA 302, CFA 304, and control unit 308 corresponds to specific embodiments of LSA 102, CFA 104, and control unit 108, respectively. According to some embodiments, and as depicted in FIG. 3A, optical assembly 300 further includes optics 310, which corresponds to specific embodiments of optics 110.

According to some embodiments, LSA 302 may be a LED array, such as, for example, an inorganic mLED array or an OLED array.

According to some embodiments, and as depicted in FIG. 3A, color filters 330 include a first color filter 330*a*, a second color filter 330*b*, a third color filter 330*c*, and a fourth color filter 330*d*. According to some embodiments, first color filter 330*a*, when switched on, may be configured to block light in the first APC. Second color filter 330*b*, when switched on, may be configured to filter therethrough light in the first APC. Third color filter 330*c*, when switched on, may be configured to block light in the second APC. Fourth color filter 330*d*, when switched on, may be configured to filter therethrough light in the second APC. Each of color filters 330, when switched off, is configured to block all light or at least all visible light.

According to some embodiments, and as depicted in FIG. 3A, waveguides 340 include a three successively and adjacently disposed waveguides: a first waveguide 340*a*, a second waveguide 340*b*, and a third waveguide 340*c*. First waveguide 340*a* includes a first side-portion 342*a*1 and a second side-portion 342*a*2 positioned oppositely to first side-portion 342*a*1. Similarly, second waveguide 340*b* includes a first side-portion 342*b*1 and a second side-portion 342*b*2 positioned oppositely to first side-portion 342*b*1.

Finally, third waveguide 340_c_ includes a first side-portion 342_cl_ and a second side-portion 342_c_2 positioned oppositely to first side-portion 342_c_1. First waveguide 340_a_, second waveguide 340_b_, and third waveguide 340_c_ are disposed in parallel to one another with second waveguide 340_b_ being positioned between first waveguide 340_a_ and third waveguide 340_c_.

According to some embodiments, each of waveguides 340 may be a slab waveguide.

According to some embodiments, and as depicted in FIG. 3A, each of waveguides 340 has embedded therein one or two beam splitting components, respectively. A first beam splitting component 344_a_ is embedded in first side-portion 342_a_1 of first waveguide 340_a_. A second beam splitting component 344_b_1 and a third beam splitting component 344_b_2 are embedded in first side-portion 342_b_1 and second side-portion 342_b_2, respectively, of second waveguide 340_b_. A fourth beam splitting component 344_c_ is embedded in second side-portion 342_c_2 of second waveguide 340_b_. According to some embodiments, first waveguide 340_a_ may have embedded in second side-portion 342_a_2 a first mirror 346_a_, and third waveguide 340_c_ may have embedded in first side-portion 342_c_1 a second mirror 346_c_.

According to some embodiments, one or more of beam splitting components 344 may be a dichroic mirror, as described in detail below. According to some embodiments, diffraction gratings may be employed instead of dichroic mirrors. According to some embodiments, waveguides 340 may be diffractive waveguides. According to some embodiments, one or more of beam splitting components 344 may be dielectric beam splitters.

According to some embodiments, first color filter 330_a_ and second color filter 330_b_ may be disposed between first waveguide 340_a_ and second waveguide 340_b_, and third color filter 330_c_ and fourth color filter 330_d_ may be disposed between second waveguide 340_b_ and third waveguide 340_c_: First color filter 330_a_ may be disposed between first side-portion 342_al_ and first side-portion 342_b_1. Second color filter 330_b_ may be disposed between second side-portion 342_a_2 and second side-portion 342_b_2. Third color filter 330_c_ may be disposed between first side-portion 342_b_1 and first side-portion 342_c_1. Fourth color filter 330_d_ may be disposed between second side-portion 342_b_2 and second side-portion 342_c_2.

According to some embodiments, and as depicted in FIG. 3A, first waveguide 340_a_ may be positioned such that light generated by LSA 302 enters CFA 304 via first side-portion 342_a_1. Waveguides 340, color filters 330, beam splitting components 344, and mirrors 346 relative positions and orientations may be such that light, selectively filtered through CFA 304, exits CFA 304 via second side-portion 342_c_2 of third waveguide 340_c_, as elaborated on below. In particular, color filters 330, beam splitting components 344, and mirrors 346 relative positions and orientations may be such that in order to transition from first waveguide 340_a_ to second waveguide 340_b_, light must necessarily pass through one of first color filter 330_a_ and second color filter 330_b_, and in order to transition from second waveguide 340_b_ to third waveguide 340_c_, light must necessarily pass through one of third color filter 330_c_ and fourth color filter 330_d_.

According to some embodiments, both above and below first beam splitting component 344_a_ and below first mirror 346_a_, first waveguide 340_a_ may be coated with an anti-reflective coating. Similarly, both above and below second beam splitting component 344_b_1 and third beam splitting component 344_b_2, second waveguide 340_b_ may be coated with an anti-reflective coating. Finally, above second mirror 346_c_ and above and below fourth beam splitting component 344_c_, third waveguide 340_c_ may be coated with an anti-reflective coating. The anti-reflective coating may minimize undesirable reflections off the surfaces of waveguides 340, thereby reducing loss of intensity.

Figure 3B:
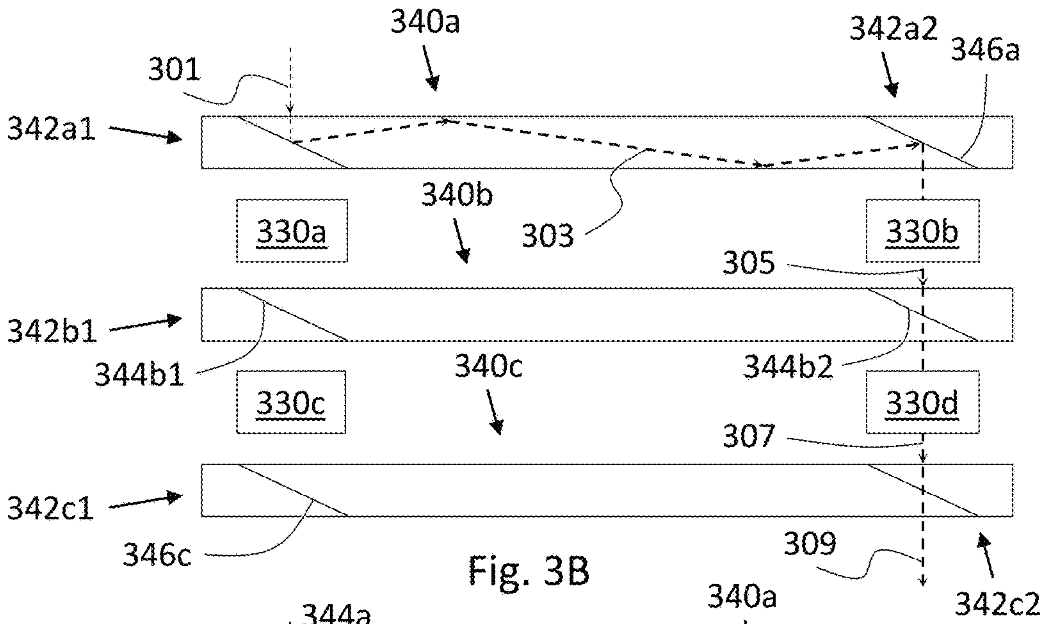
FIG. 3B schematically depicts the optical assembly of FIG. 3A, wherein the color filter arrangement is in a first transmission mode wherein only light in a first additive primary color is filtered through the color filter arrangement, according to some embodiments.

According to some embodiments, CFA 304 is switchable by control unit 308 between three transmission modes:

In a first transmission mode, CFA 304 filters therethrough light in the first APC with first color filter 330_a_ switched off and second color filter 330_b_ and fourth color filter 330_d_ switched on. (Third color filter 330_c_ may be switched on or off.) As shown in FIG. 3B, the filtered light propagates along first waveguide 340_a_ from first side-portion 342_a_1 to second side-portion 342_a_2, and exits CFA 304 via second side-portion 342_c_2 of third waveguide 340_c_ after having passed through second side-portion 342_b_2 of second waveguide 340_b_.

Figure 3C:
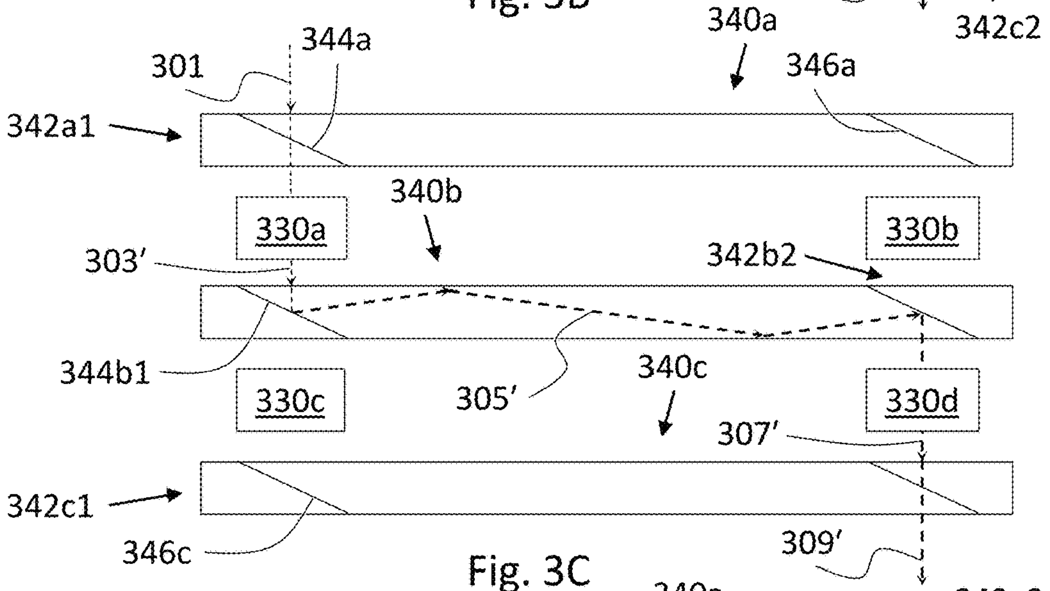
FIG. 3C schematically depicts the optical assembly of FIG. 3A, wherein the color filter arrangement is in a second transmission mode wherein only light in a second additive primary color is filtered through the color filter arrangement, according to some embodiments.

In a second transmission mode, CFA 304 filters therethrough light in the second APC with first color filter 330_a_ switched on, second color filter 330_b_ and third color filter 330_c_ switched off, and fourth color filter 330_d_ switched on. As shown in FIG. 3C, the filtered light enters second waveguide 340_b_ via first side-portion 342_b_1, after having passed through first side-portion 342_a_1 of first waveguide 340_a_. The filtered light propagates along second waveguide 340_b_ from first side-portion 342_b_1 to second side-portion 342_b_2, and exits CFA 304 via second side-portion 342_c_2 of third waveguide 340_c_.

Figure 3D:
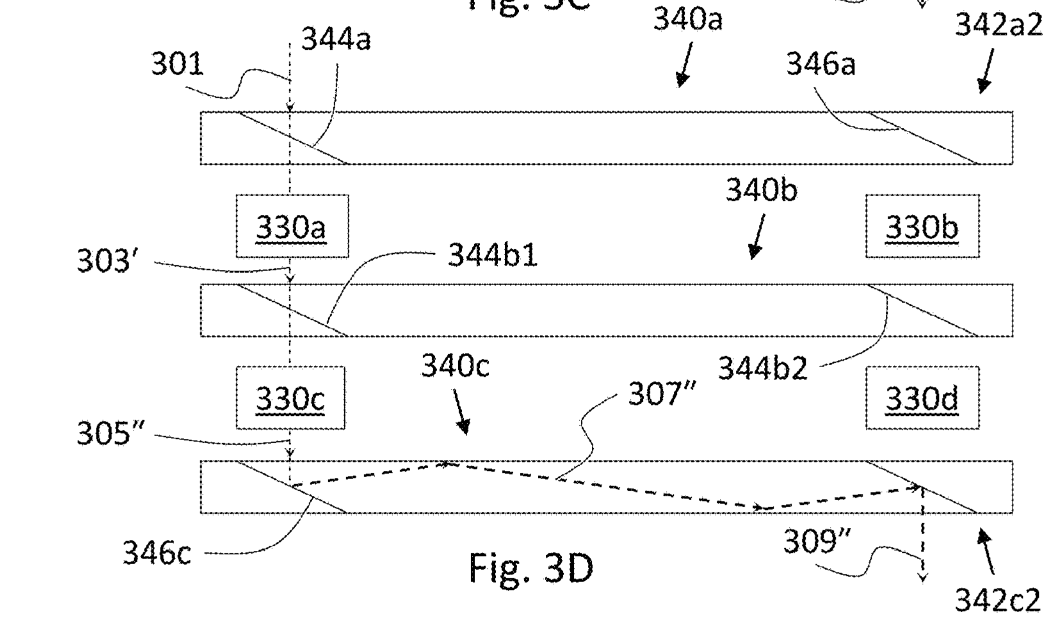
FIG. 3D schematically depicts the optical assembly of FIG. 3A, wherein the color filter arrangement is in a third transmission mode wherein only light in a third additive primary color is filtered through the color filter arrangement, according to some embodiments.

In a third transmission mode, CFA 304 filters therethrough light in the third APC with first color filter 330_a_ switched on, second color filter 330_b_ switched off, third color filter 330_c_ switched on, and fourth color filter 330_d_ switched off. As shown in FIG. 3D, the filtered light enters third waveguide 340_c_ via first side-portion 342_c_1, after having passed through first side-portion 342_al_ of first waveguide 340_a_ and second side-portion 342_b_2 of second waveguide 340_b_. The filtered light propagates along third waveguide 340_c_ from first side-portion 342_cl_ to second side-portion 342_c_2, wherefrom the filtered light exits CFA 304.

FIG. 3B schematically depicts filtering of light generated by LSA 302 when CFA 304 is in the first transmission mode, according to some embodiments. Light (indicated by a dashed arrow 301), incident on first side-portion 342_a_1, is partially reflected and partially transmitted by first beam splitting component 344_a_, with the reflected light (indicated by dashed arrows 303) propagating along first waveguide 340_a_ towards first mirror 346_a_, and the transmitted light (not shown), on exiting first waveguide 340_a_, being blocked by first color filter 330_a_ (which is switched off in the first transmission mode). The propagated light is next reflected by first mirror 346_a_, exits first waveguide 340_a_ via second side-portion 342_a_2, and is filtered into the first APC by second filter 330_b_ (as indicated by dashed arrow 305). Next, the filtered light enters second waveguide 340_b_ via second side-portion 342_b_2. In second side-portion 342_b_2, the entered light is partially transmitted by third beam splitting component 344_b_2. The light transmitted by third beam splitting component 344_b_2 exits second waveguide 340_b_ (via second side-portion 342_b_2) towards fourth color filter 330_d_, is filtered therethrough (as indicated by a dashed arrow 307), and enters third waveguide 340_c_ (via second side-portion 342_c_2). In second side-portion 342_c_2, the entered light is partially transmitted by fourth beam splitting component 344c. The transmitted light exits third waveguide 340c (as indicated by a dashed arrow 309).

FIG. 3C schematically depicts filtering of light generated by LSA 302 when CFA 304 is in the third transmission mode, according to some embodiments. Light (indicated by dashed arrow 301), incident on first side-portion 342a1, is partially transmitted by first beam splitting component 344a, with the transmitted light being filtered through first color filter 330a (as indicated by a dashed arrow 303') into the second and third APCs. The light (not shown), reflected by first beam splitting component 344a, propagates along first waveguide 340a towards first mirror 346a, is reflected thereby, and on exiting from first waveguide 340a, via second side-portion 342a2, is blocked by second color filter 330b (which is switched off in the second transmission mode). The filtered light enters second waveguide 340b (via first side-portion 342b1), is partially reflected by second beam splitting component 344b1, and propagates along second waveguide 340b (as indicated by dashed arrows 305'). The light (not shown) transmitted by second beam splitting component 344b1, on exiting second waveguide 340b, is blocked by third color filter 330c (which is switched off in the second transmission mode). The light propagated along second waveguide 340b is next partially transmitted by third beam splitting component 344b2, exits second waveguide 340b (via second side-portion 342b2), and is filtered into the second APC by fourth color filter 330d (as indicated by a dashed arrow 307'). The filtered light enters third waveguide 340c (via second side-portion 342c2). In second side-portion 342c2, the entered light is partially transmitted by fourth beam splitting component 344c. The transmitted light exits third waveguide 340c (as indicated by a dashed arrow 309').

FIG. 3D schematically depicts filtering of light generated by LSA 302 when CFA 304 is in the third transmission mode, according to some embodiments. Light (indicated by dashed arrow 301), incident on first side-portion 342a1, is partially transmitted by first beam splitting component 344a, with the transmitted light being filtered through first color filter 330a (as indicated by dashed arrow 303') into the second and third APCs. The light (not shown), reflected by first beam splitting component 344a, propagates along first waveguide 340a towards first mirror 346a, is reflected thereby, and on exiting from first waveguide 340a, via second side-portion 342a2, is blocked by second color filter 330b (which is switched off in the third transmission mode). The filtered light enters second waveguide 340b (via first side-portion 342b1), is partially transmitted by second beam splitting component 344b1, and exits second waveguide 340a (via first side-portion 342b1). The light (not shown), reflected by second beam splitting component 344b1, propagates along second waveguide 340b, is partially reflected by third beam splitting component 344b2, and, on exiting second side-portion 342b2, is blocked by fourth color filter 330d (which is switched off in the third transmission mode). The light exiting first-side portion 342b1 (i.e. the light transmitted by second beam splitting component 344b1), is filtered by third color filter 330c into the third APC (as indicated by a dashed arrow 305"), and next enters third waveguide 340c (via first side-portion 342c1). In first side-portion 342c1, the entered light is reflected by second mirror 346c. The reflected light propagates along third waveguide 340c (as indicated by dashed arrows 307"), is partially reflected by fourth beam splitting component 344c, and exits third waveguide 340c via second side-portion 342c2 (as indicated by a dashed arrow 309").

According to some embodiments, first beam splitting component 344a may be a dichroic mirror configured to transmit light in each of the second and third APCs and to reflect light in the first APC. Second beam splitting component 344b1 may be a dichroic mirror configured to transmit light in the third APC and to reflect light in the second APC. Third beam splitting component 344b2 may be a dichroic mirror configured to transmit light in the first APC and to reflect light in the second APC. Fourth beam splitting component 344c may be a dichroic mirror configured to transmit light in the first and second APCs and to reflect light in the third APC. According to some such embodiments (i.e. embodiments wherein beam splitting components 344 are dichroic mirrors, as described above, or diffraction gratings having the same APC filtering properties) instead of color filters 330, filters without color filtering capabilities (e.g. shutters) may be employed.

According to some embodiments, each of color filters 330 includes a respective filter component (a static filter; not shown) and a respective shutter. According to some such embodiments, each of the filter components of first color filter 330a and fourth color filter 330d may be configured to block light in the respective APC. Each of the filter components of second color filter 330b and third color filter 330c may be configured to filter therethrough light in the respective APC. Each shutter is configured to be controllably opened and closed at command from control unit 308, such that, when closed, the shutter prevents light from arriving at the respective filter component or blocks light transmitted through the respective filter component. According to some embodiments, the shutters may be mechanically actuated. Alternatively, according to some embodiments, each of the shutters may be an LCD panel, in which case, optics 310 may additionally include a linear polarizer (not shown) positioned between LSA 302 and CFA 304.

According to some embodiments, dichroic mirrors 344 need not be perfect in the sense of not acting as a perfect band pass filter. For example, according to some such embodiments, outside the chromatic band(s), transmitted/reflected therethrough, dichroic mirrors 344 may transmit/reflect light at an attenuated intensity rather than fully blocking the light. As used herein, according to some embodiments, the term “dichroic mirror” may be used in an expansive manner to cover also imperfect dichroic mirrors, as described above.

According to some embodiments, optics 310 includes a collimating lens 328 positioned between LSA 302 and CFA 304.

Figure 4:
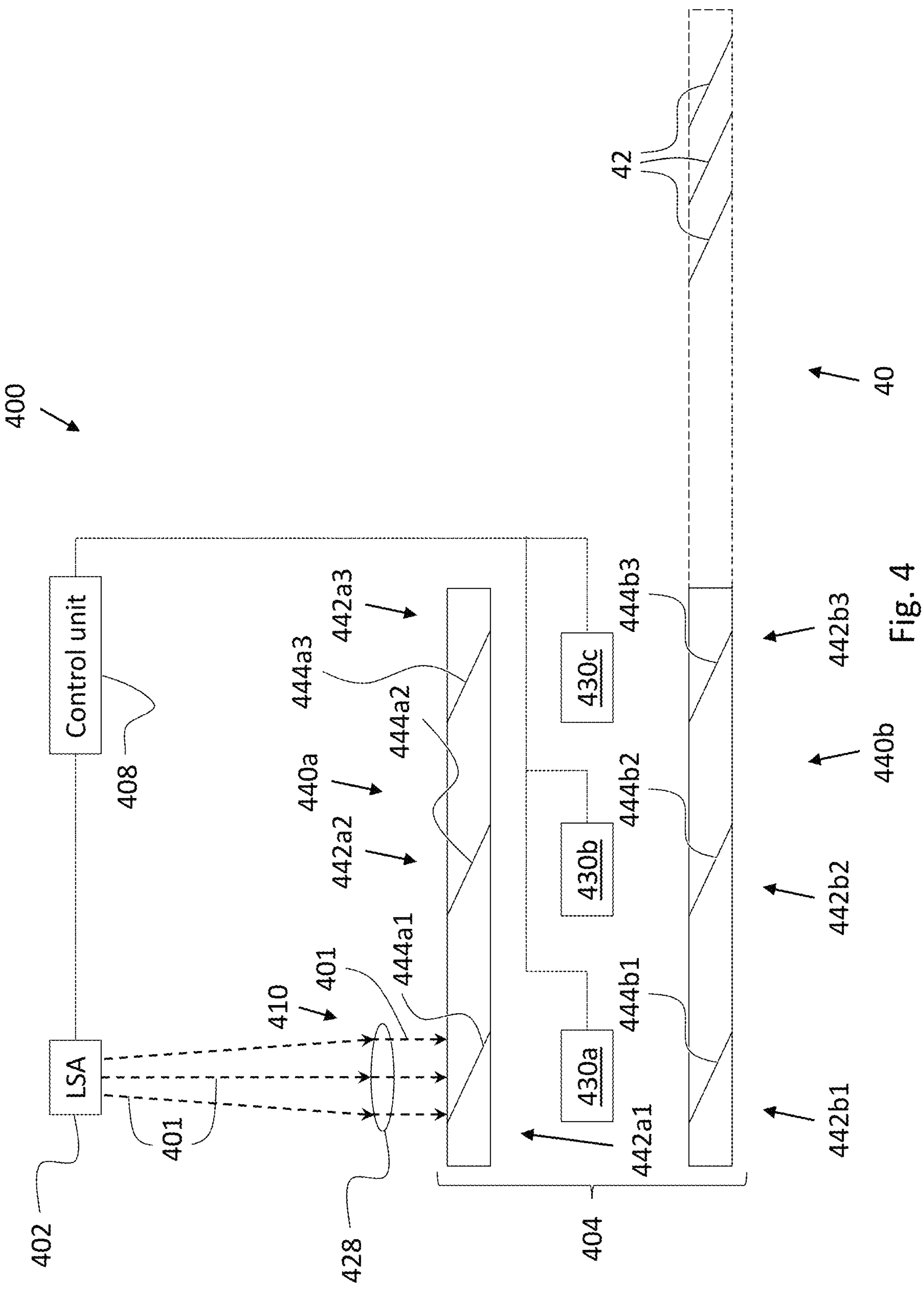
FIG. 4 schematically depicts an optical assembly for generating a color image using white light as source, which corresponds to specific embodiments of the optical assembly of FIG. 1A, the optical assembly includes a color filter arrangement including a plurality of color filters, according to some embodiments.

FIG. 4 schematically depicts an optical assembly 400, according to some embodiments. Optical assembly 400 corresponds to specific embodiments of optical assembly 100, wherein the CFA includes a plurality of color filters and waveguides. Optical assembly 400 includes an LSA 402, a CFA 404 including a plurality of color filters 430 and a plurality of waveguides 440, and a control unit 408. Each of LSA 402, CFA 404, and control unit 408 corresponds to specific embodiments of LSA 102, CFA 104, and control unit 108, respectively. According to some embodiments, and as depicted in FIG. 4, optical assembly 400 further includes optics 410, which corresponds to specific embodiments of optics 410.

According to some embodiments, LSA 402 may be a LED array, such as an inorganic mLED array or an OLED array.

According to some embodiments, and as depicted in FIG. 4, color filters 430 include a first color filter 430a, a second color filter 430b, and a third color filter 430c. First color filter 430a, when switched on, is configured to block all visible light except light in the first APC. Second color filter 430_b_, when switched on, is configured to block all visible light except light in the second APC. Third color filter 430_c_, when switched on, is configured to block all visible light except light in the third APC. Each of color filters 430, when switched off, is configured to block all visible light.

According to some embodiments, and as depicted in FIG. 4, waveguides 440 include a first waveguide 440_a_ and a second waveguide 440_b_. First waveguide 440_a_ includes a first side-portion 442_a_1, a central portion 442_a_2, and a second side-portion 442_a_3. Central portion 442_a_2 extends from first side portion 442_al_ to second side-portion 442_a_3. Similarly, second waveguide 440_b_ includes a first side-portion 442_b_1, a central portion 442_b_2, and a second side-portion 442_b_3. Central portion 442_b_2 extends from first side-portion 442_b_1 to second side-portion 442_b_3. First waveguide 440_a_ and second waveguide 440_b_ are disposed in parallel to one another.

According to some embodiments, each of waveguides 440 may be a slab waveguide.

According to some embodiments, and as depicted in FIG. 4, each of first waveguide 440_a_ and second waveguide 440_b_ has embedded therein a plurality of dichroic mirrors 444_a_ and 444_b_, respectively: A first dichroic mirror 444_a_1 is embedded in first side-portion 442_a_1 of first waveguide 440_a_. A second dichroic mirror 444_a_2 is embedded in central portion 442_a_2 of first waveguide 440_a_. A third dichroic mirror 444_a_3 is embedded in second side-portion 442_a_3 of first waveguide 440_a_. (So that third dichroic mirror 444_a_3 is positioned adjacently to second dichroic mirror 444_a_2, which, in turn, is positioned adjacently to first dichroic mirror 444_a_1.) A fourth dichroic mirror 444_b_1 is embedded in first side-portion 442_b_1 of second waveguide 440_b_. A fifth dichroic mirror 444_b_2 is embedded in central portion 442_b_2 of second waveguide 440_b_. A sixth dichroic mirror 444_b_3 is embedded in second side-portion 442_b_3 of second waveguide 440_b_. (So that sixth dichroic mirror 444_b_3 is positioned adjacently to fifth dichroic mirror 444_b_2, which, in turn, is positioned adjacently to fourth dichroic mirror 444_b_1.)

Color filters 430 are disposed between first waveguide 440_a_ and second waveguide 440_b_. First color filter 430_a_ may be disposed between first side-portion 442_a_1 of first waveguide 440_a_ and first side-portion 442_b_1 of second waveguide 440_b_. Second color filter 430_b_ may be disposed between central portion 442_a_2 of first waveguide 440_a_ and central portion 442_b_2 of second waveguide 440_b_. Third color filter 430_c_ may be disposed between second side-portion 442_a_3 of first waveguide 440_a_ and second side-portion 442_b_3 of second waveguide 440_b_.

According to some embodiments, and as depicted in FIG. 4, first waveguide 440_a_ may be positioned such that light generated by LSA 402 enters CFA 404 via first side-portion 442_a_1. Waveguides 440 and dichroic mirrors 444 (i.e. dichroic mirrors 444_a_ and 444_b_) relative positions and orientations may be such that light, selectively filtered through CFA 404, exits CFA 404 via second side-portion 442_b_3 of second waveguide 440_b_, as elaborated on below. In particular, color filters 430 and dichroic mirrors 444 relative positions and orientations may be such that in order to transition from first waveguide 440_a_ to second waveguide 440_b_, light must necessarily pass through one of color filters 430.

According to some embodiments, CFA 404 is switchable by control unit 408 between three transmission modes:

- In a first transmission mode, CFA 404 filters therethrough light in the first APC. First color filter 430_a_ is switched on and second color filter 430_b_ and third color filter 430_c_ are switched off.
- In a second transmission mode, CFA 404 filters therethrough light in the second APC. Second color filter 430_b_ is switched on and third color filter 430_c_ and first color filter 430_a_ are switched off.
- In a third transmission mode, CFA 404 filters therethrough light in the third APC. Third color filter 430_c_ is switched on and first color filter 430_a_ and second color filter 430_b_ are switched off.

According to some embodiments, first dichroic mirror 444_al_ may be configured to transmit only light in the first APC, second dichroic mirror 444_a_2 may be configured to reflect only light in the second APC or transmit only light in the third APC, third dichroic mirror 444_a_3 may be configured to reflect only light in the third APC. According to some embodiments, fourth dichroic mirror 444_b_1 may be configured to reflect only light in the first APC, fifth dichroic mirror 444_b_2 may be configured to reflect only light in the second APC, and sixth dichroic mirror 444_b_3 may be configured to reflect only light in the third APC.

Accordingly, in such embodiments, when only first color filter 430_a_ is switched on, light incident on first side-portion 442_a_1 (_a_) is filtered by first dichroic mirror 444_a_1 into the first APC, (b) exits first waveguide 440_a_ via first side-portion 442_a_1, (c) is transmitted through first color filter 430_a_, (d) enters second waveguide 440_b_ via first side-portion 442_b_1, (e) is reflected by fourth dichroic mirror 444_b_1 onto fifth dichroic mirror 444_b_2, (f) is transmitted through fifth dichroic mirror 444_b_2, and (g) is output after transmission through sixth dichroic mirror 444_b_3. When only second color filter 430_b_ is switched on, light incident on first side-portion 442_a_1 (a') is reflected into the second and third APCs by first dichroic mirror 444_a_1 in the direction of second dichroic mirror 444_a_2, (b') is reflected by second dichroic mirror 444_a_2 into the second APC, (c') exits first waveguide 440_a_ via central portion 442_a_2, (d') is transmitted through second color filter 430_b_, (e') enters second waveguide 440_b_ via central portion 442_b_2, (f*) is reflected by fifth dichroic mirror 444_b_2 onto sixth dichroic mirror 444_b_3, and (g') is output after transmission through sixth dichroic mirror 444_b_3. When only third color filter 430_c_ is switched on, light incident on first side-portion 442_a_1, (a") is reflected into the second and third APCs by first dichroic mirror 444_a_1 in the direction of second dichroic mirror 444_a_2, (b") is filtered into the third APC by second dichroic mirror 444_a_2, (c") is reflected by third dichroic mirror 444_a_3, (d") exits first waveguide 440_a_ via second side-portion 442_a_3, (e") is transmitted through third color filter 430_c_, (f") enters second waveguide 440_b_ via second side-portion 442_b_3, and (g") is output after reflection by sixth dichroic mirror 444_b_3.

According to some embodiments, dichroic mirrors 444 need not be perfect in the sense of not acting as a perfect band pass filter. For example, according to some such embodiments, outside the chromatic band(s), filtered/reflected therethrough, dichroic mirrors 444 may pass/reflect light at an attenuated intensity rather than fully blocking the light.

According to some alternative embodiments, instead of third dichroic mirror 444_a_3, first waveguide 440_a_ may have embedded a standard mirror (i.e. reflecting all light), and/or instead of fourth dichroic mirror 444_b_1, second waveguide 440_b_ may have embedded therein a standard mirror.

According to some alternative embodiments, instead of one or more of first dichroic mirror **444*a*1, second dichroic mirror 444*a*2, fifth dichroic mirror 444*b*2, and sixth dichroic mirror 444*b*3**, dielectric beam splitters may be employed.

According to some embodiments, each of color filters 430 includes a respective filter component (a static filter; not shown) and a respective shutter. Each filter component is configured to filter therethrough light in the respective APC. Each shutter is configured to be controllably opened and closed at command from control unit 408, such that, when closed, the shutter prevents light from arriving at the respective filter component or blocks light transmitted through the respective filter component. According to some embodiments the shutters may be mechanically actuated. Alternatively, according to some embodiments, each of the shutters may be an LCD panel, in which case, LSA 402 optics 410 may additionally include a linear polarizer (not shown) positioned between LSA 402 and CFA 404.

According to some embodiments, both above and below first dichroic mirror **444*a*1, and below each of second dichroic mirror 444*a*2 and third dichroic mirror 444*a*3, first waveguide 440*a* may be coated with an anti-reflective coating. Similarly, above each of fourth dichroic mirror 444*b*1 and fifth dichroic mirror 444*b*2, and above and below sixth dichroic 444*b*3, second waveguide 440*b* may be coated with an anti-reflective coating. The anti-reflective coating may minimize undesirable reflections off the surfaces of waveguides 440**, thereby reducing loss of intensity.

According to some embodiments, and as depicted in FIG. 4, second waveguide **440*b* may be joined at a boundary thereof to a LOE 40, which corresponds to specific embodiments of LOE 10. According to some alternative embodiments, second waveguide 440*b* may form a LOE, such as LOE 10. Also indicated are beam splitters 42 embedded in an end portion (not numbered) of LOE 40**.

According to some alternative embodiments, instead of color filters 430, filters without color filtering capabilities (e.g. shutters) may be employed, so that the APC filtering is implemented solely by dichroic mirrors 444. According to other alternative embodiments, instead of color filters 430, filters without color filtering capabilities may be employed, and, in addition, instead of dichroic mirrors 444, diffraction gratings-having the same APC filtering properties as dichroic mirrors 444—may be employed.

According to some embodiments, instead of using dichroic mirrors, or in addition to the use thereof, waveguides 440 may be coated by dichroic coatings to achieve the same color filtering. Additionally or alternatively, according to some embodiments, color filters 430 may be chromatic absorptive filters.

According to some embodiments, optics 410 includes a collimating lens 428 positioned between LSA 402 and CFA 404.

Also shown in FIG. 4 are trajectories of light rays (indicated by dashed arrows 401, not all of which are numbered) from LSA 402, (via collimating lens 428) to first waveguide **440 *a***.

Figure 5B:
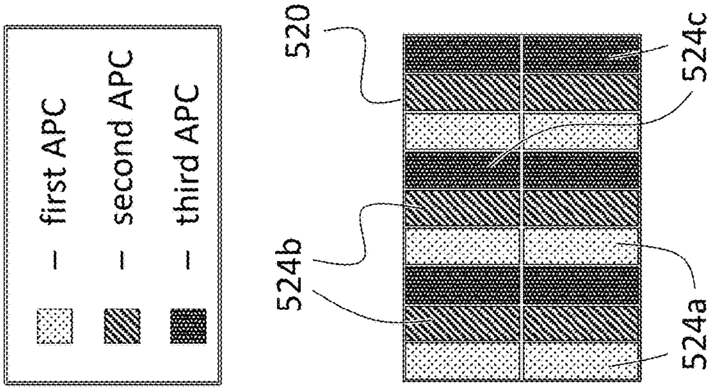
FIG. 5B schematically depicts the LCoS array of FIG. 5A, according to some embodiments.
Figure 5A:
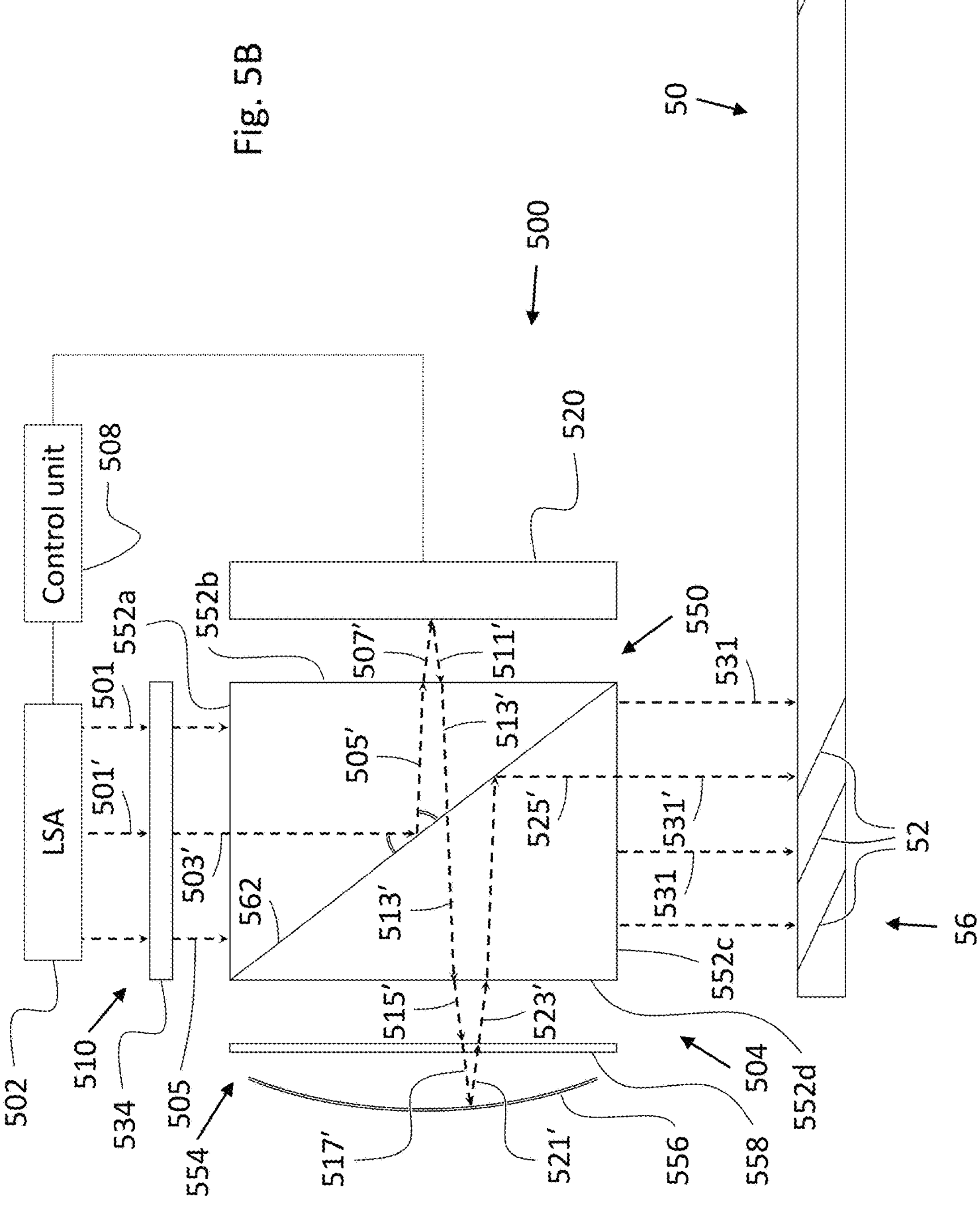
FIG. 5A schematically depicts an optical assembly for generating a color image using white light as source, the optical assembly including a LCoS array and corresponding to specific embodiments of the optical assembly of FIG. 1A.

FIG. 5A schematically depicts an optical assembly 500, according to some embodiments. Optical assembly 500 corresponds to specific embodiments of optical assembly 100, wherein the CFA includes a color selective switch based on a liquid crystal on silicon (LCoS) array. Optical assembly 500 includes an LSA 502, a CFA 504 including a LCoS array 520, and a control unit 508. Each of LSA 502, CFA 504, and control unit 508 corresponds to specific embodiments of LSA 102, CFA 104, and control unit 108, respectively. According to some embodiments, and as depicted in FIG. 5, optical assembly 500 further includes optics 510, which corresponds to specific embodiments of optics 110.

According to some embodiments, LSA 502 may be a LED array, such as an inorganic mLED array or an OLED array.

According to some embodiments, and as depicted in FIG. 5A, optics 510 may include a polarizer 534.

According to some embodiments, in addition to LCoS array 520, CFA 504 may include a polarizing beam splitter (PBS) 550 and collimating optics 554 including a collimating mirror arrangement 556 and a quarter waveplate 558. Collimating mirror arrangement 556 (shown for simplicity as including a single reflective element in FIG. 5A) may include a plurality of curved mirrors and lenses and/or a Fresnel lens(es). PBS 550 includes a first face **552*a*, a second face 552*b*, a third face 552*c* opposite to first face 552*a*, and a fourth face 552*d* opposite to second face 552*b*. Polarizer 534 may be positioned between LSA 502 and first face 552*a*, so as to ensure that light-originating in LSA 502 and entering PBS 550—is polarized. According to some embodiments, polarizer 534 is a linear polarizer. LCoS array 520 may be positioned opposite second face 552*b*. Quarter waveplate 558 may be positioned between fourth face 552*d* and collimating mirror arrangement 556. As elaborated on below, in operation, light input into PBS 550, via first face 552*a*, is output via third face 552*c***.

Referring also to FIG. 5B, FIG. 5B presents a schematic front view of LCoS array 520, according to some embodiments. LCoS array 520 includes a plurality of cells 524. Each of cells 524 may include one or more first sub-cells **524*a*, one or more second sub-cells 524*b*, and one or more one third sub-cells 524*c* corresponding to the first APC, second APC, and third APC, respectively. Sub-cells corresponding to the same color may be jointly on and off switchable by control unit 508. When switched off, a sub-cell does not reflect any light impinging thereon. When switched on, a sub-cell reflects, or partially reflects, only light at the APC corresponding thereto. The degree of reflection, i.e. the percentage of the impinging light that is reflected, is controlled on an individual sub-cell basis by control unit 508, as elaborated on below. Cells 524 and sub-cells 524*a*, 524*b*, and 524*c*** may be arranged in any pattern known in the art of LCoS arrays.

Each of the light sources in LSA 502 may be configured to illuminate at least one cell from cells 524. According to some such embodiments, of the light sources in LSA 502 may be configured to illuminate a plurality of cells from cells 524, optionally, with each of cells 524 in LCoS array 520 being positioned to receive light only from, or substantially only from, a respective light source in LSA 502. In particular, PBS 550 and collimating optics 554 may be configured such that light produced by LSA 502 is imaged on LCoS array 520.

According to some embodiments, for each of the APCs, control unit 508 may be configured to send a pair of intensity maps: a lower-resolution intensity map to LSA 502 and a higher-resolution intensity map to LCoS array 520. Thus, given image data in the form of three pairs of intensity maps corresponding to each of the three APCs, respectively, control unit 508 may be configured to successively send to LSA 102 and LCoS array 520 the three pairs of intensity maps. More precisely, control unit 508 may be configured to successively send the lower-resolution intensity maps to LSA 502 and the higher-resolution intensity maps to LCoS array 520 (with each pair of intensity maps being sent simultaneously or substantially simultaneously).

Each of the lower-resolution intensity maps constitutes a two-dimensional (spatial) intensity distribution that may specify per each of light sources 112 a respective intensity value. Each of the higher-resolution intensity maps constitutes a two-dimensional (spatial) intensity distribution that may specify per each of the sub-cells in LCoS array, which corresponds to the same APC as the lower-resolution intensity map, a respective intensity value.

More specifically, the reflection level of each sub-cell—that is, the percentage of light in the corresponding APC, which when impinging on the sub-cell, the sub-cell reflects—is dictated by the higher-resolution map corresponding to the same APC as the sub-cell. Thus, in contrast to optical assembly 200 (and optical assemblies 300 and 400), wherein the resolution of the virtual images is determined by the density of the light sources in the LSA (e.g. the density of the inorganic mLEDs or OLEDs in the inorganic mLED or OLED array, respectively), in optical assembly 500, the resolution of the virtual images is determined by the LCoS array (i.e. the density of the sub-cells therein).

Given a RGB color bitmap, that is, three intensity maps corresponding to each of the APCs, respectively, each pair of lower-resolution and higher-resolution intensity maps (in combination) reproduces the intensity map associated with the corresponding APC (as specified by the color bitmap). Consequently, by sufficiently rapidly actuating the light sources in LSA 502 and, in succession, sub-cells 524*a*, 524*b*, and 524*c* according to each of the pairs of the intensity maps, the generated illumination patterns-optionally, after passage through an output element, such as LOE 50)—are effectively combined, so as to be perceivable by eye as a single color image (which the color bitmap encodes).

According to some embodiments, control unit 508 may be configured to decompose each of the three intensity maps of a RGB color bitmap into a pair of lower-resolution and higher-resolution intensity maps, as described above. Advantageously, according to some such embodiments, control unit 508 may include processing and memory components (e.g. a graphics processing unit) configured to decompose each of the three intensity maps of a RGB color bitmap such that overall power consumed in generating the associated illumination patterns is minimized or at least economized. Alternatively, according to some embodiments, control unit 508 may be configured to receive the three pairs of intensity maps from a computational unit, not included in optical assembly 500, such as a processor of an AR NED, which includes optical assembly 500. According to some such embodiments, the processor may be configured to decompose the three intensity maps of a RGB color bitmap such that overall power consumed in generating the associated illumination patterns is minimized or at least economized.

According to some embodiments, CFA 504 is switchable by control unit 508 between three transmission modes (or, equivalently, LCoS array 520 may be said to be switchable by control unit 508 between three reflection modes):

- In a first transmission mode, second sub-cells 524*b* and third sub-cells 524*c* are switched off, so that LCoS array 520 does not reflect any light in the second and third APCs. Each of first sub-cells 524*a* may be switched on to reflect a respective percentage of light incident thereon, as specified by the respective higher-resolution intensity map (i.e. corresponding to the first APC).
- In a second transmission mode, third sub-cells 524*c* and first sub-cells 524*a* are switched off, so that LCoS array 520 does not reflect any light in the third and first APCs. Each of second sub-cells 524*b* may be switched on to reflect a respective percentage of light incident thereon, as specified by the respective higher-resolution intensity map (i.e. corresponding to the second APC).
- In a third transmission mode, first sub-cells 524*a* and second sub-cells 524*b* are switched off, so that LCoS array 520 does not reflect any light in the first and second APCs. Each of third sub-cells 524*c* may be switched on to reflect a respective percentage of light incident thereon, as specified by the respective higher-resolution intensity map (i.e. corresponding to the third APC).

According to some embodiments, and as depicted in FIG. 5A, PBS 550 is composed of two prisms, which are joined at their bases. A surface 562 indicates the boundary between the bases. In operation, light rays 501—generated by LSA 502 and with intensities dictated by a lower-resolution intensity map—may be polarized by polarizer 534 to form linearly polarized light rays 503. Light rays 503 enter PBS 550 via first face 552*a*. Only one of light rays 503, a light ray 503', is shown inside PBS 550, but the following will be understood to apply to each of light rays 503. Polarizer 534 is configured to pass light at a linear polarization such that on entry to PBS 550 and incidence on surface 562, the light will be fully reflected. Consequently, light ray 503' is fully reflected by surface 562, as indicated by a reflected light ray 505'. Light ray 505' travels towards second face 552*b*, and is refracted thereby, as indicated by a refracted light ray 507'.

Light ray 507' is filtered, reflected, and has the polarization thereof rotated by 90° by one or more of the sub-cells in LCoS array 520 corresponding to the same APC as the lower-resolution intensity map according to which light rays 501 were generated. As compared to the intensity of light ray 507' in the APC band, the intensity of the reflected light ray—a light ray 511'—is attenuated by a factor dictated by the higher-resolution intensity map corresponding to the APC (i.e. the APC to which the lower-resolution intensity map corresponds). Light ray 511' travels back towards second face 552*b* and is refracted on entry to PBS 550. Due to the polarization thereof (90° rotated relative to the original polarization), the refracted light ray, i.e. a light ray 513', is fully transmitted across surface 562 travels towards fourth face 552*d*, and is refracted on exiting PBS 550, as indicated by a refracted light ray 515'. Light ray 515' traverses quarter waveplate 558, emerging therefrom as a circularly polarized light ray 517'.

Light ray 517' is reflected by collimating mirror arrangement 556, as indicated by a reflected light ray 521'. Light ray 521' traverses quarter waveplate 558, emerging therefrom as a linearly polarized light ray 523' in the original linear polarization (i.e. the polarization as light rays 503). Light ray 523' enters PBS 550 via fourth face 552*d* and, due to the polarization thereof, is fully reflected by surface 562 and exits PBS 550 via third face 552*c*, as indicated by a reflected light ray 525' and a refracted light ray 531'.

Light ray 531' constitutes one of light rays 531. Each of light rays 531 can be "traced back" to one of light rays 501, respectively.

Also indicated in FIG. 5A are mirrors 52 and beam splitters 54 arranged on a first end-portion 56 and a second end-portion 58, respectively, of LOE 50, according to some embodiments. Mirrors 52 are configured to reflect light impinging thereon (e.g. light filtered through CFA 504) towards beam splitters 54 in second end-portion 58. Beam splitters 54 are configured to output the filtered light arriving thereat from first end-portion 56 together with ambient light, such as to output an AR image.

Figure 6:
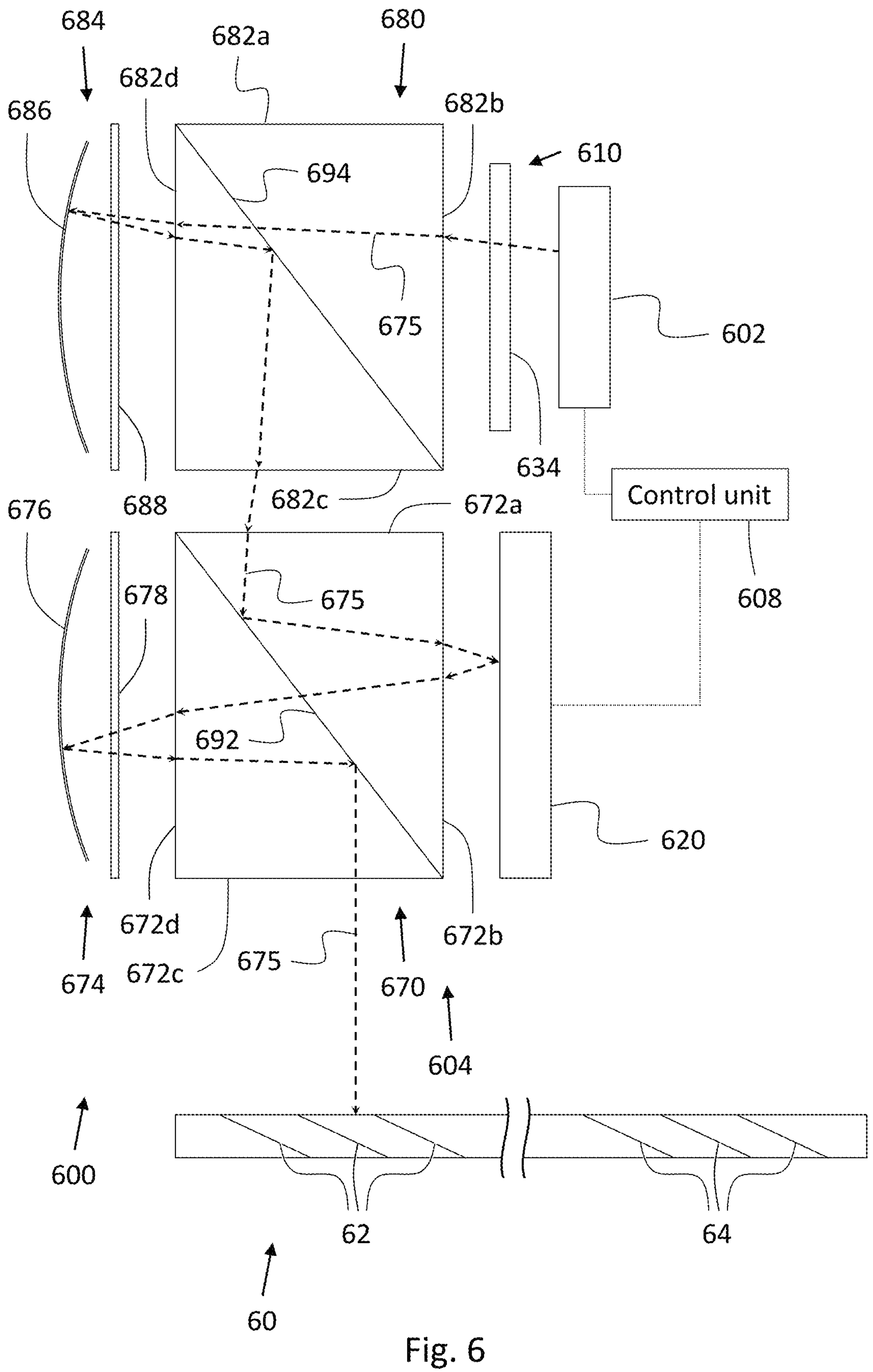
FIG. 6 schematically depicts an optical assembly for generating a color image using white light as source, the optical assembly including a LCoS array and corresponding to specific embodiments of the optical assembly of FIG. 1A.

FIG. 6 schematically depicts an optical assembly 600, according to some embodiments. Optical assembly 500 corresponds to specific embodiments of optical assembly 100, wherein the CFA includes a color selective switch based on a liquid crystal on silicon (LCoS) array. Optical assembly 600 includes an LSA 602, a CFA 604 including a LCoS array 620, and a control unit 608. Each of LSA 602, CFA 604, and control unit 608 corresponds to specific embodiments of LSA 102, CFA 104, and control unit 108, respectively. According to some embodiments, and as depicted in FIG. 6, optical assembly 600 further includes optics 610, which corresponds to specific embodiments of optics 110, and which may include a polarizer 634.

Optical assembly 600 is similar to optical assembly 500 but differs therefrom at least in including two PBSs instead of a single PBS: A first PBS 670 and a second PBS 680. A first collimating optics 674 includes a first collimating mirror arrangement 676 and a first quarter waveplate 678, which are positioned in a similar manner relative to first PBS 670 as collimating mirror arrangement 556 and quarter waveplate 558 are positioned relative to PBS 550 of optical assembly 500. Similarly, a second collimating optics 684 includes a second collimating mirror arrangement 686 and a second quarter waveplate 688, which are positioned in a similar manner relative to second PBS 680 as collimating mirror arrangement 556 and quarter waveplate 558 are positioned relative to PBS 550 of optical assembly 500.

First PBS 670 may include a first (top) face **672*a*, a second face 672*b* that may be perpendicular to first face 672*a*, a third face 672*c* opposite to the first face 672*a*, and a fourth face 672*d* opposite to second face 672*b*. First PBS 670 may further include an (inner) surface 692, which may be similar to surface 562 of PBS 550. Similarly, second PBS 680 may include a first (top) face 682*a*, a second face 682*b* that may be perpendicular to first face 682*a*, a third face 682*c* opposite to the first face 682*a*, and a fourth face 682*d* opposite to second face 682*b*. Second PBS 680 may further include an (inner) surface 694, which may be similar to surface 562 of PBS 550**.

Polarizer 634 is positioned between LSA 602 and second face **682*b* of second PBS 680. Polarizer 634 may be similar to polarizer 534. According to some embodiments, polarizer 634** is a linear polarizer.

Second PBS 680 is positioned above first PBS 670 with third face **682*c* of second PBS 680 facing first face 672*a* of first PBS 670**.

A trajectory of a light ray 675, according to some embodiments, is shown from its generation by LSA 602 to its output by second PBS 680.

According to some embodiments, and as depicted in FIG. 6, light generated by LSA 602 enters second PBS 680 via second face **682*b*, exits via fourth face 682*d*, is reflected by second collimating optics 684 and has its polarization rotated by 90°, before reentering second PBS 680. The reentered light is reflected by second PBS 680 towards first PBS 670, exits second PBS 680 via third face 682*c* and enters first PBS 670 via first face 672*a*. The light entered into first PBS 670 follows a similar trajectory to that depicted in FIG. 5**A.

According to some embodiments, second PBS 680 and second collimating optics 684 are configured such that light produced by LSA 602 is imaged (after passage via first PBS 670) on LCoS array 620.

Also indicated in FIG. 6 are mirrors 62 and beam splitters 64 arranged on the first end-portion and the second end-portion (not numbered), respectively, of LOE 60, according to some embodiments and as described above with respect to LOE 50 of FIG. 5A.

Methods

Figure 7:
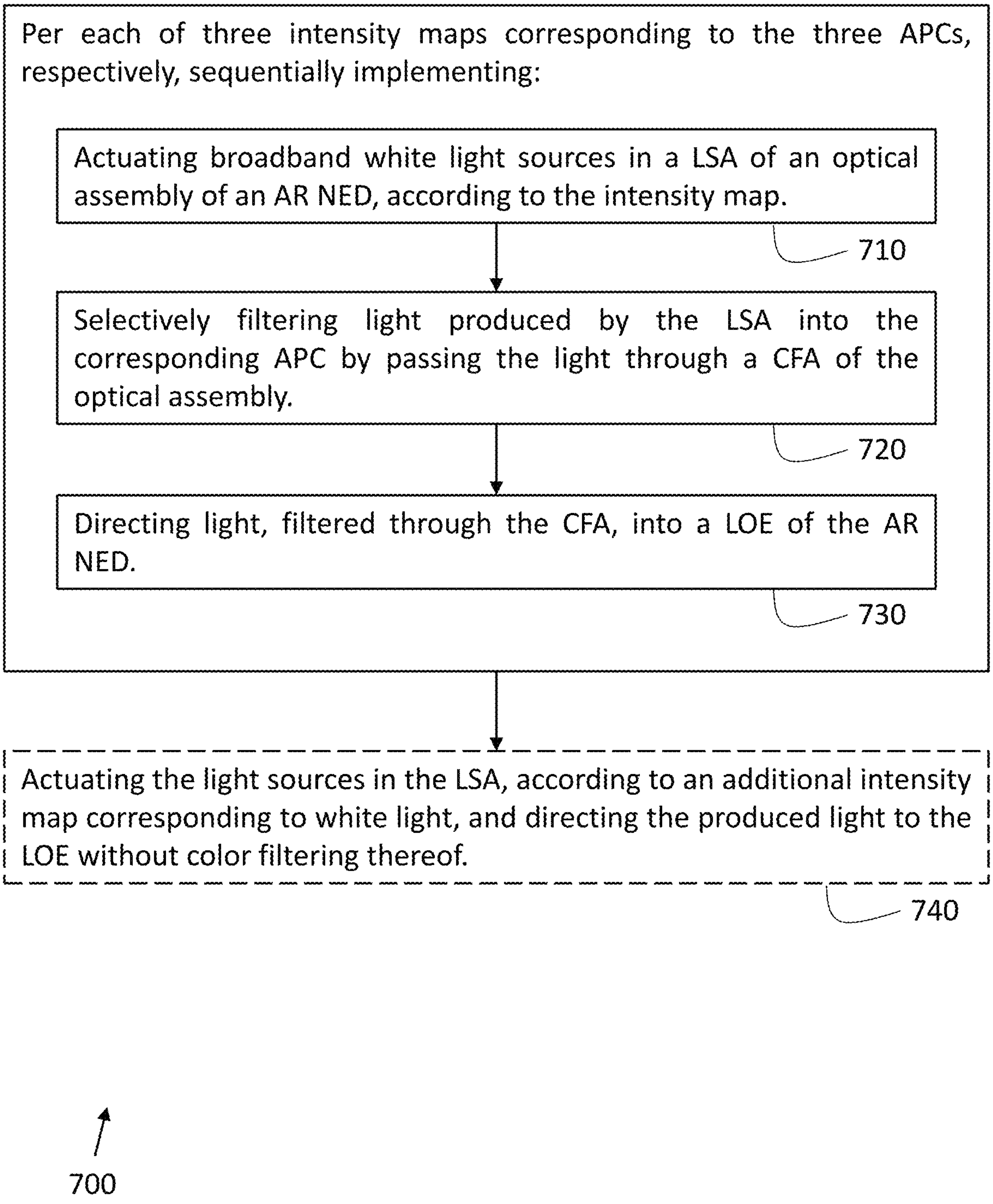
FIG. 7 presents a flowchart of a method for generating a color image using white light as source, according to some embodiments.

According to an aspect of some embodiments, there is provided a method for overlaying a virtual image on a real image in an AR NED. FIG. 7 presents a flowchart of such a method, a method 700, according to some embodiments. Method 700 may include sequential implementation-per each of three intensity maps corresponding to the three APCs, respectively-stages of:

- A stage 710 of actuating broadband white light sources in an LSA (such as the LSAs described above in the Systems subsection and LSAs similar thereto) of an optical assembly (such as the optical assemblies described above in the Systems subsection and optical assemblies similar thereto) of an AR NED according to the intensity map.
- A stage 720 of selectively filtering light produced by the LSA into the corresponding APC by passing the light through a CFA (such as the CFAs described above in the Systems subsection and CFAs similar thereto) of the optical assembly.
- A stage 730 of directing light, filtered through the CFA, into a LOE (such as the LOEs described above in the Systems subsection and LOEs similar thereto) of the AR NED.

According to some embodiments, the three intensity maps may be specified by a RGB color bitmap. According to some embodiments, stage 710 may be implemented using a LED array, such as an inorganic mLED array or an OLED array, essentially as detailed in the description of FIGS. 1A and 1B in the Systems subsection.

According to some embodiments, stage 720 may be implemented using a CFA, such as CFA 104. According to some embodiments, stage 720 may be implemented using an LCD array, such as LCD array 220, to selectively filter the light produced by the LSA, essentially as detailed in the description of FIGS. 2A and 2B in the Systems subsection. According to some embodiments, stage 720 may be implemented using a plurality of color filters, such as color filters 330 or color filters 430, to selectively filter the light produced by the LSA, essentially as detailed in the description of FIGS. 3A-3D or in the description of FIG. 4 in the Systems subsection. According to some embodiments, stage 720 may be implemented using a LCoS array, such as LCoS array 520 or LCoS array 620, to selectively filter the light produced by the LSA, essentially as detailed in the description of FIGS. 5A and 5B or FIG. 6 in the Systems subsection.

According to some embodiments, operations of the LSA and the operations of the CFA may be synchronized using a control unit, such as control unit 108 (so as to ensure that when light sources in the LSA are actuated according to an intensity map corresponding to one of the APCs, the CFA filters therethrough light in the corresponding APC).

In stage 730, the LOE may be configured to output the filtered light together with ambient light incident on the LOE, such that a (virtual) image formed by the filtered light is overlaid on a (real) image formed by the ambient light, essentially as described above in the Systems subsection with respect to LOE 10.

Method 700 may be realized (i.e. implemented) using an AR NED including optical assembly 100, any one of the specific embodiments thereof, i.e. optical assemblies 200, 300, 400, 500, and 600, and optical assemblies similar thereof. Thus, when method 700 is realized using an AR NED including optical assembly 100 and LOE 10, then stages 710, 720, and 730 are realized using LSA 102, CFA 104, control unit 108, and LOE 10. Similarly, when method 700 is realized using an AR NED including optical assembly 200 and LOE 20, then stages 710, 720, and 730 are realized using LSA 202, CFA 204, control unit 208, and LOE 20, and so on with respect to AR NEDs including optical assembly 300 and a corresponding embodiment of LOE 10, optical assembly 400 and LOE 40, optical assembly 500 and LOE 50, or optical assembly 600 and LOE 60, respectively.

Optionally, according to some embodiments, method 700 may be configured for RGBW illumination. In such embodiments, method 700 may include a stage 740. Stage 740 may be performed prior to the three implementations of the sequence of stages 710, 720, and 730, after the three implementations, or even in between two of the implementations (e.g. in between the first implementation and the second implementation). According to some embodiments, stage 740 may include actuating the light sources in the LSA according to an additional intensity map, transmitting the produced light through the CFA without color filtering thereof, and directing the transmitted light to the LOE. Optionally, according to some alternative embodiments, the light produced by the additional intensity map may be guided directly to the LOE without having to pass through the CFA. The additional intensity map corresponds to white light.

More specifically, a RGB color bitmap specifies intensities $\{R_{ij}', G_{ij}', B_{ij}'\}_{i,j}$, wherein the indices i and j specify the position of the light source within the LSA (so that $R_{ij}'$, $G_{ij}'$, and $B_{ij}'$ are red, green, and blue light intensities specified for the (i, j)-th light source). As a non-limiting example, according to some embodiments, corresponding RGBW intensity maps may specify, optionally, up to an overall multiplicative constant, $\{R_{ij}=R_{ij}'-W_{ij}, G_{ij}'=G_{ij}-W_{ij}, B_{ij}=B_{ij}'-W_{ij}, W_{ij}\}_{i,j}$. Here, for each pair i and j pair, the white light intensity map specifies the intensity $W_{ij}=\min(R_{ij}', G_{ij}', B_{ij}')$ with the minimum taken over the three intensities $R_{ij}'$, $G_{ij}'$, $B_{ij}'$.

According to some embodiments, method 700 may include consecutive implementations according to sequences of three intensity maps (or four intensity maps in embodiments including stage 740), one sequence after the other, such that a stream of virtual images (a sequence of video images) is generated.

According to some embodiments, the CFA may include a first, second, and third type of filtering elements (cells or sub-cells), arranged in an array, and configured to filter light incident thereon into the first, second, and third APCs, respectively, with each of the filtering elements being individually addressable. More precisely, an intensity of light filtered by each filtering element may be controlled on an individual bases, as detailed, for example, with respect to optical assembly 500 in the description of FIGS. 5A and 5B in the Systems subsection. According to some such embodiments, method 700 may further include an initial preprocessing stage, wherein each of the three color intensity maps—specified by the RGB color bitmap—is respectively decomposed into a lower-resolution intensity map and a higher-resolution intensity map.

Each of the lower-resolution intensity maps specifies per each light source in the LSA (e.g. per each LED in the LED array) a respective intensity value. Each of the higher-resolution intensity maps specifies per each filtering element in the CFA, which corresponds to the same APC as the lower-resolution intensity map, a respective intensity value. Each pair of lower-resolution and higher-resolution intensity maps (in combination) reproduces the intensity map associated with the corresponding APC (as specified by the color bitmap).

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A method for displaying an image in a near-eye display (NED), the method comprising:

providing the NED comprising an optical assembly for generating a color image using white light as source and a lightguide optical element (LOE), wherein the optical assembly comprising:

a light source array (LSA) comprising a plurality of broadband white light sources;

a color filter assembly (CFA); and a control unit;

wherein the CFA comprises at least two waveguides, which are adjacently and successively disposed, and at least three filters disposed between the waveguides and/or embedded within the waveguides, each of the filters corresponding to one of three additive primary colors (APCs);

wherein each of the waveguides has embedded therein at least two optical elements selected from at least one dichroic mirror, at least one beam splitting component, and/or at least one mirror;

wherein a first waveguide of the at least two waveguides is configured to have transmitted thereinto light generated by the LSA;

wherein the control unit is configured to actuate the light sources in the LSA according to each of three intensity maps, each of the intensity maps corresponding to one of the APCs, and to individually switch on and off each of the filters of the CFA;

wherein the control unit is further configured to synchronize the switching of the filters of the CFA with the actuation of the light sources in the LSA, such that for each APC, its corresponding filter is switched on and the light sources are actuated according to its corresponding intensity map simultaneously; and wherein the optical assembly is coupled to the LOE.

2. The method of claim 1, wherein the LSA is a light emitting diode (LED) array.

3. The optical assembly of claim 2, wherein the LED array is an inorganic micro-LED (mLED) array or an organic LED (OLED) array.

4. The method of claim 1, wherein the at least three filters comprise at least three color filters; and wherein (i) at least one of the color filters is configured to, when switched on, filter therethrough light in a respective APC from the three APCs, and, when switched off, block all light arriving thereat, and/or (ii) at least one of the color filters is configured to, when switched on, block light in a respective APC from the three APCs, and, when switched off, block all light arriving thereat.

5. The method of claim 4, wherein the at least three color filters comprise a first color filter, a second color filter, and a third color filter configured to filter therethrough light in only one of the three APCs, respectively;

wherein the at least one dichroic mirror comprises at least three dichroic mirrors, each of the dichroic mirrors being configured to reflect or filter light in a respective APC from the three APCs;

wherein the first, second, and third color filters are disposed between the first waveguide and the last waveguide; and wherein each of the dichroic mirrors is embedded within one of the waveguides, such that:

light generated by the LSA, and incident on a dichroic mirror, embedded in the first waveguide, is either directed thereby onto a respective one of the first, second, and third color filters or onto an adjacent dichroic mirror in the first waveguide; and light filtered through any of the first, second, and third color filters, and incident on a dichroic mirror, embedded in the last waveguide, is reflected inside the second waveguide.

6. The method of claim 5, wherein the at least three dichroic mirrors comprise six dichroic mirrors, wherein a first dichroic mirror, a second dichroic mirror, and a third dichroic mirror, are embedded in a first side-portion, a central portion, and a second side-portion of the first waveguide, respectively, the central portion being disposed between the first and second side-portions of the first waveguide;

wherein a fourth dichroic mirror, a fifth dichroic mirror, and a sixth dichroic mirror, are embedded in a first side-portion, a central portion, and a second side-portion of the last waveguide, respectively, the central portion being disposed between the first and second side-portions of the last waveguide;

wherein the first, second, and third color filters are disposed between the first side-portions, the central portions, and the second side-portions, respectively; and wherein the color filters and dichroic mirrors are configured such that when only the first color filter, only the second color filter, and only the third color filter, is switched on, light, generated by the LSA, and incident on the first side-portion of the first waveguide, is filtered into the first APC, the second APC, and the third APC, respectively, and is output at the second side-portion of the last waveguide.

7. The method of claim 4, wherein at least one of the at least three color filters comprises a respective filter component and a respective shutter;

wherein the filter component is configured to transmit light only in the corresponding APC; and wherein each shutter is configured to be controllably opened and closed at command from the control unit, such that, when closed, the shutter prevents light from arriving at the respective filter component or blocks light transmitted through the respective filter component.

8. The method of claim 7, wherein the optical assembly further comprises a linear polarizer, and at least one of the shutters is an LCD panel, configured to be actuated by the control unit; and/or wherein at least one of the shutters is a mechanical shutter.

9. The method of claim 1, wherein the at least two waveguides further comprise a second waveguide, which is disposed between the first waveguide and the last waveguide;

wherein the at least one beam splitting component comprises a first beam splitting component, a second beam splitting component, a third beam splitting component, and a fourth beam splitting component;

wherein the at least one mirror comprises a first mirror and a second mirror;

wherein the first waveguide has embedded, in a first side-portion thereof, the first beam splitting component, and, in a second side-portion thereof, the first mirror;

wherein the second waveguide has embedded, in a first side-portion thereof, the second beam splitting component, and, in a second side-portion thereof, the third beam splitting component;

wherein the last waveguide has embedded, in a first side-portion thereof, the second mirror, and, in a second side-portion thereof, the fourth beam splitting component;

wherein the first waveguide is configured to have transmitted thereinto the light generated by the LSA at the first side-portion thereof;

wherein the light filtered through the CFA is output from the second side-portion of the last waveguide; and wherein each of the beam splitting components is a dichroic mirror, a diffraction grating, or a dielectric beam splitter.

10. The method of claim 9, wherein the at least three color filters comprise four color filters, with:

a first of the four color filters being disposed between the first side-portion of the first waveguide and the first side-portion of the second waveguide, or embedded within the first side-portion of the first waveguide;

a second of the four color filters being disposed between the second side-portion of the first waveguide and the second side-portion of the second waveguide, or embedded within the second side-portion of the first waveguide;

a third of the four color filters being disposed between the first side-portion of the second waveguide and the first side-portion of the last waveguide, or embedded within the first side-portion of the second waveguide; and a fourth of the four color filters being disposed between the second side-portion of the second waveguide and the second side-portion of the last waveguide, or embedded within the second side-portion of the second waveguide; and wherein APC filtering properties of each of the color filters, positionings thereof, and actuation times, are such that the first, second, and last waveguides propagate there across light in only one of first, second, and third APCs, respectively.

11. The method of claim 10, wherein:

when switched on, the first color filter blocks only light in the first APC;

when switched on, the second color filter filters therethrough only light in the first APC;

when switched on, the third color filter filters therethrough only light in the second APC; and when switched on, the fourth color filter blocks only light in the second APC.

12. The method of claim 1, further comprising optics configured to direct light from the LSA onto the CFA, wherein the optics comprises one or more lenses configured to collimate light generated by the LSA.

13. The method of claim 1, wherein the at least three filters comprise a first filter, a second filter, and a third filter, wherein each filter, when switched on, is open and transmits all light incident thereon, and, when switched off, is closed and blocks all light incident thereon;

wherein the at least one dichroic mirror comprises at least three dichroic mirrors, each of the dichroic mirrors being configured to reflect or filter light in a respective APC from the three APCs; and wherein each of the dichroic mirrors is embedded within one of the waveguides, such that:

light generated by the LSA, and incident on a dichroic mirror, embedded in the first waveguide, is either directed thereby onto a respective one of the three filters or onto an adjacent dichroic mirror in the first waveguide; and light filtered through any of the three filters and incident on a dichroic mirror, embedded in the last waveguide, is reflected inside the last waveguide.

14. The method of claim 13, wherein the at least three dichroic mirrors comprise six dichroic mirrors, wherein a first dichroic mirror, a second dichroic mirror, and a third dichroic mirror, are embedded in a first side-portion, a central portion, and a second side-portion of the first waveguide, respectively, the central portion being disposed between the first and second side-portions of the first waveguide;

wherein a fourth dichroic mirror, a fifth dichroic mirror, and a sixth dichroic mirror, are embedded in a first side-portion, a central portion, and a second side-portion of the last waveguide, respectively, the central portion being disposed between the first and second side-portions of the last waveguide;

wherein the first, second, and third filters are disposed between the first side-portions, the central portions, and the second side-portions, respectively; and wherein the filters and dichroic mirrors are configured such that when only the first filter, only the second filter, and only the third filter is open, light, generated by the LSA, and incident on the first side-portion of the first waveguide, is filtered into the first, second, and third APCs, respectively, and is output at the second side-portion of the last waveguide.

15. The method of claim 1, wherein the at least three filters comprise a first filter, a second filter, a third filter, and a fourth filter, each filter, when switched on, is open and transmits all light incident thereon, and, when switched off, is closed and blocks all light incident thereon;

wherein the at least two waveguides further comprise a second waveguide, which is disposed between the first waveguide and the last waveguide;

wherein the at least one beam splitting component comprises a first beam splitting component, a second beam splitting component, a third beam splitting component, and a fourth beam splitting component;

wherein the at least one mirror comprises a first mirror, and a second mirror;

wherein the first waveguide has embedded, in a first side-portion thereof, a first beam splitting component, and, in a second side-portion thereof, a first mirror;

wherein the second waveguide has embedded, in a first side-portion thereof, a second beam splitting component, and, in a second side-portion thereof, a third beam splitting component;

wherein the last waveguide has embedded, in a first side-portion thereof, a second mirror, and, in a second side-portion thereof, a fourth beam splitting component;

wherein the first waveguide is configured to have transmitted thereinto the light generated by the LSA at the first side-portion thereof, and the light filtered through the CFA is output from the second side-portion of the last waveguide; and wherein each of the beam splitting components is a dichroic mirror or a diffraction grating.

16. The method of claim 15, wherein the first filter is disposed between the first side-portion of the first waveguide and the first side-portion of the second waveguide, or is embedded within the first side-portion of the first waveguide;

wherein the second filter is disposed between the second side-portion of the first waveguide and the second side-portion of the second waveguide, or is embedded within the second side-portion of the first waveguide;

wherein the third filter is disposed between the first side-portion of the second waveguide and the first side-portion of the last waveguide, or is embedded within the first side-portion of the second waveguide;

wherein the fourth filter is disposed between the second side-portion of the second waveguide and the second side-portion of the last waveguide, or is embedded within the second side-portion of the second waveguide; and wherein the first dichroic mirror is configured to reflect only light in the first APC;

wherein the second dichroic mirror is configured to transmit only light in the third APC or reflect only light in the second APC;

wherein the third dichroic mirror is configured to transmit only light in the first APC or reflect only light in the second APC;

wherein the fourth dichroic mirror is configured reflect only light in the third APC; and wherein the positionings of the four filters, and actuation times thereof, are such that the first, second, and last waveguides propagates there across light in only one of first, second, and third APCs, respectively.

17. The method of claim 1, wherein the at least three intensity maps jointly constitute a color bitmap.

18. The method of claim 1, wherein the control unit is further configured to successively actuate light sources in the LSA according to a plurality of groups of intensity maps, each group of intensity maps comprising at least three intensity maps corresponding to the three APCs, such that the light output by the optical assembly corresponds to a sequence of video frames.

19. The method of claim 1, wherein the CFA is further configured to allow for controllable transmission therethrough of white light; and wherein the control unit is further configured to actuate light sources in the LSA according to an additional intensity maps, corresponding to white light.

* * * * *